(12) United States Patent
Okuno et al.

(10) Patent No.: US 7,773,098 B2
(45) Date of Patent: Aug. 10, 2010

(54) VIRTUAL REALITY PRESENTATION APPARATUS AND METHOD

(75) Inventors: Yasuhiro Okuno, Setagaya-ku (JP); Hideo Noro, Setagaya-ku (JP); Taichi Matsui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 779 days.

(21) Appl. No.: 11/429,543

(22) Filed: May 5, 2006

(65) Prior Publication Data
US 2006/0256110 A1 Nov. 16, 2006

(30) Foreign Application Priority Data

| May 11, 2005 | (JP) | 2005-138453 |
| May 31, 2005 | (JP) | 2005-159855 |
| Jun. 27, 2005 | (JP) | 2005-187081 |

(51) Int. Cl.
*G09G 5/00* (2006.01)

(52) U.S. Cl. .................. 345/629; 345/156; 345/958

(58) Field of Classification Search ................ 345/958, 345/953
See application file for complete search history.

(56) References Cited

U.S. PATENT DOCUMENTS

| 6,166,744 | A * | 12/2000 | Jaszlics et al. ............... 345/629 |
| 6,223,201 | B1 * | 4/2001 | Reznak .......................... 718/102 |
| 6,280,323 | B1 * | 8/2001 | Yamazaki et al. ............... 463/4 |
| 6,336,864 | B1 * | 1/2002 | Nakanishi ..................... 463/33 |
| 6,629,065 | B1 * | 9/2003 | Gadh et al. ..................... 703/1 |
| 7,102,635 | B2 * | 9/2006 | Shih et al. ..................... 345/419 |
| 7,319,466 | B1 * | 1/2008 | Tarr et al. ..................... 345/419 |
| 2002/0109668 | A1 * | 8/2002 | Rosenberg et al. ........... 345/156 |
| 2004/0233222 | A1 * | 11/2004 | Lee et al. ..................... 345/621 |
| 2006/0154713 | A1 * | 7/2006 | Sunazuka et al. .............. 463/6 |
| 2006/0233098 | A1 * | 10/2006 | McArdle ..................... 370/216 |
| 2007/0216679 | A1 * | 9/2007 | Nakamura et al. ........... 345/423 |

FOREIGN PATENT DOCUMENTS

| JP | 6-259506 | 9/1994 |
| JP | 2005-108108 | 4/2005 |

\* cited by examiner

*Primary Examiner*—Jason M Repko
(74) *Attorney, Agent, or Firm*—Cowan, Liebowitz & Latman, P.C.

(57) ABSTRACT

A virtual reality presentation apparatus (100) has a CPU (101) which controls the overall apparatus, a memory (103) which stores various programs, a memory (104) which stores various data, an HMD (105) as a video display device, and a position and orientation controller (106) having position and orientation sensors (107, 108, 109), which are connected to each other via a bus (102). After a position and orientation required to render a CG scene for one frame are determined, when CG objects are in an interference state immediately before this processing and the difference between the current time and an interference time (128) set upon determining the interference state does not exceed an interference detection skip time (124), CG image generation means (112) generates a CG scene for one frame based on the determined position and orientation without checking if an interference has occurred between the CG objects.

2 Claims, 15 Drawing Sheets

F I G. 5A
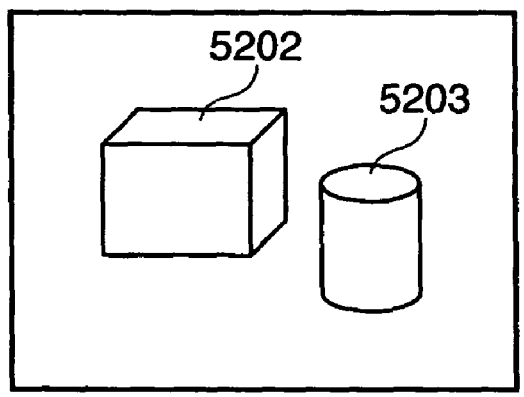
F I G. 5B
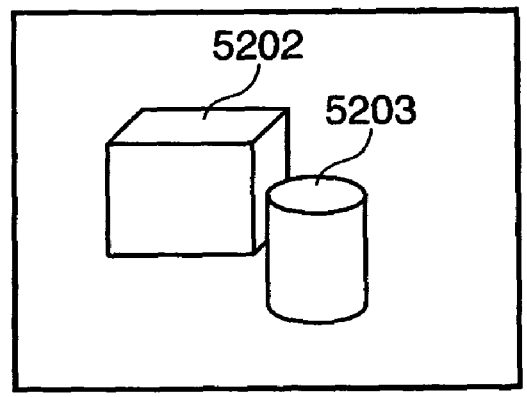
F I G. 5C
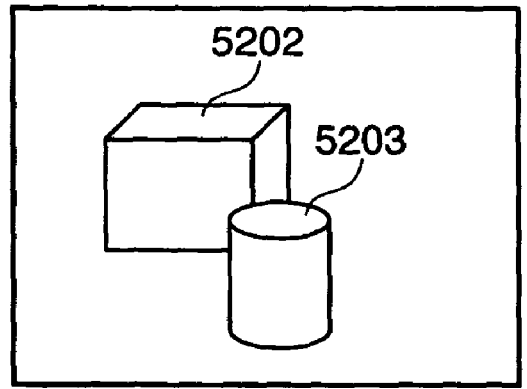
F I G. 5D
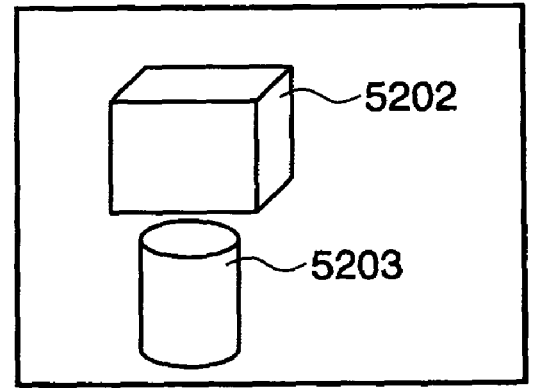

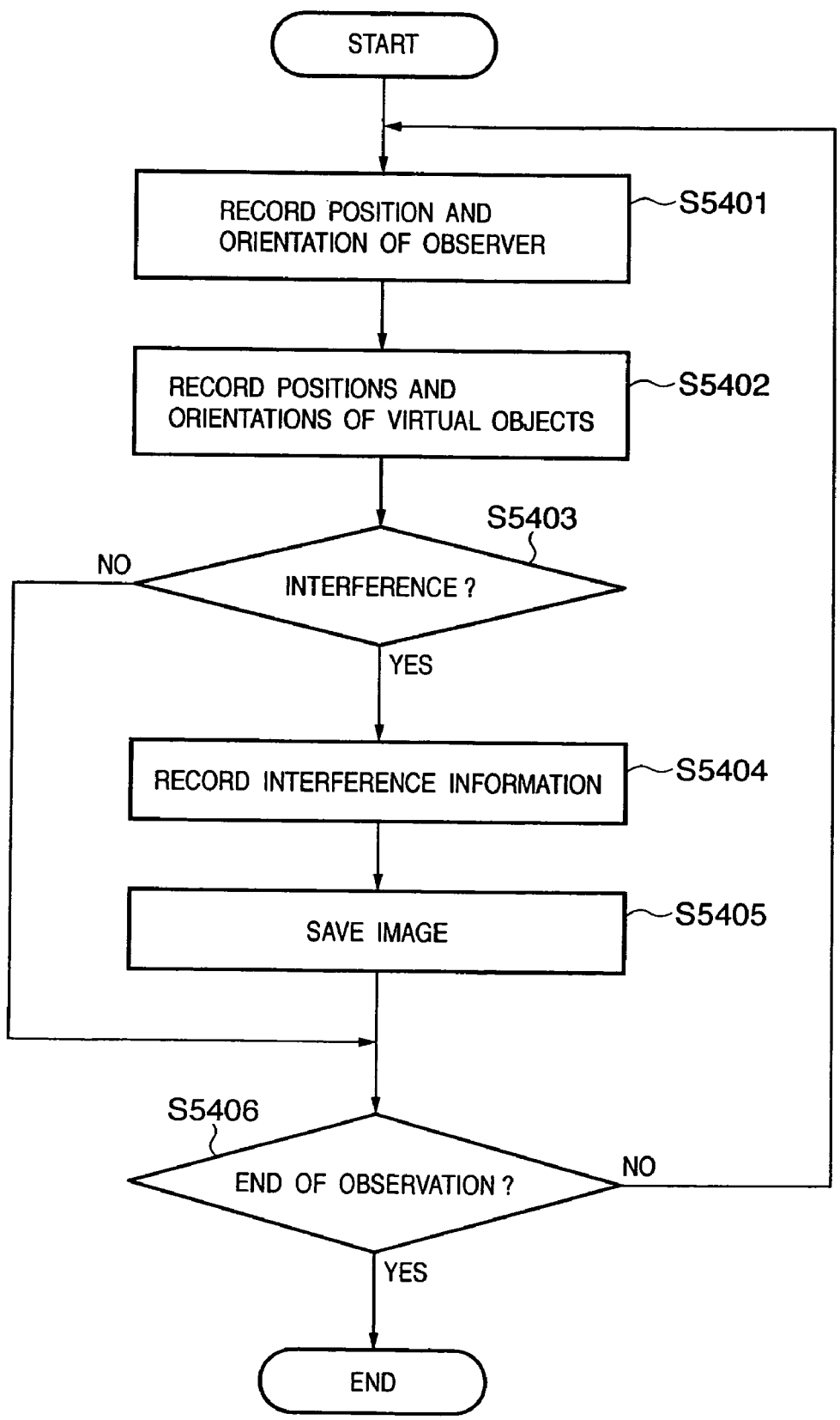

VIRTUAL REALITY PRESENTATION APPARATUS AND METHOD

FIELD OF THE INVENTION

The present invention relates to a virtual reality presentation apparatus, virtual reality presentation method, and program and, more particularly, to a virtual reality presentation apparatus, virtual reality presentation method, and program, which display a given image to a position in front of the visual field of the observer in accordance with a change in head position of the observer.

BACKGROUND OF THE INVENTION

Conventionally, a virtual reality (VR) presentation apparatus is available. The VR presentation apparatus comprises, e.g., an image display device such as a head mounted display (HMD), position and orientation detection means (e.g., a position and orientation sensor), and CG image generation means.

The position and orientation detection means is used to detect the position and orientation of the viewpoint of the observer, and to designate the position and orientation of each CG object on the virtual space. More specifically, a magnetic position and orientation sensor or the like is used. The magnetic position and orientation sensor detects the relative position and orientation between a magnetic generator (transmitter) and magnetic sensor (receiver), and FASTRAK available from Polhemus, U.S.A., or the like is known. This device detects the three-dimensional position (X, Y, Z) and orientation (Pitch, Yaw, Roll) of the sensor within a specific region in real time. When this device is attached to the HMD that the observer wears, the values of the position and orientation of the head of the observer can be detected. Also, by moving the sensor on the virtual space, the position and orientation of a CG object can be designated.

The CG image generation means lays out a CG object generated by three-dimensional (3D) modeling on the virtual space having the same scale as the physical space, and renders that virtual space based on the position and orientation of the line of sight of the observer detected by the position and orientation detection means.

By displaying a CG image generated in this way on the image display device (HMD or the like), the observer can feel as if he or she were immersed in the virtual CG space. Also, the observer can manipulate the CG object by the position and orientation sensor.

In the VR presentation apparatus, it is a common practice to complete image:update processing within a time period in which a given image frame rate or higher can be maintained, unless an image is updated in response to the behavior of the observer (a change in position and orientation of the head, manipulation of a CG object) within a given response time period.

Means for making collision and interference determination of CG objects is conventionally known, and is generally used in video games and CAD systems (for example, see Japanese Patent Laid-Open No. 6-259506).

However, the processing time required to make collision and interference determination of CG objects is influenced by the number and shapes of CG objects to be determined, the number of polygons, the number of interference points, the precision of interference determination, and the like. The determination processing can be completed within a short period of time in case of a far positional relationship, i.e., if it is determined that CG objects clearly do not interfere with each other. However, if the CG objects are close to each other or they already have an interference, many polygons which form the CG objects must be inspected in detail, resulting in a long processing time period. In some case, the processing cannot be completed within a desired frame time interval.

When the processing is not completed within the desired frame time intervals, a response to the manipulation of a CG object falls into arrears, and the observer can hardly manipulate the CG object, thus losing natural operability. For example, once the interference state has occurred and the rendering update frame rate drops extremely, the moving position of the CG object cannot be confirmed immediately if the CG object is manipulated. Therefore, the observer cannot recognize how to escape from the interference state, and can hardly manipulate the CG object. Since the manipulation of the observer is not immediately reflected in an image, natural operability required for the VR presentation apparatus is lost.

A VR system allows the user to feel the virtual space real by presenting a 3D computer graphics (CG) generated by a computer to the user. Also, in recent years, techniques for presenting information which is not available in the physical world to the user by compositing the 3D CG to the image of the physical world have been developed, and they are called an AR (Augmented Reality) system or MR (Mixed Reality) system.

The MR system can superimpose a 3D CG on a physical object. For example, in a system disclosed in Japanese Patent Laid-Open No. 2005-108108, the user can freely manipulate a virtual object by superimposing the virtual object on a physical object.

However, the system used so far is not a system which detects any interference (collision) with another virtual object upon movement of a virtual object and records an interference state. For this reason, even when the virtual objects have interfered with each other, the timing of occurrence and the accurate positions and orientations of the objects cannot be recognized.

The MR system provides a composite image obtained by compositing a physical space image and a virtual space image generated according to the viewpoint position, line of sight direction, and the like of the user. The MR system can present information to the observer as if a virtual object were existing on a physical space, and allows the observer to make an observation with a sense of actual dimensions and higher reality than a conventional virtual reality (VR) system.

In order to manipulate a CG object on the MR space, a method of associating the position and orientation of a system that measures or estimates six degrees of freedom of the position and orientation of the object on the physical space (to be referred to as a 6-degree-of-freedom sensor hereinafter) is known. For example, when a FASTRAK system available from Polhemus is used, the six degrees of freedom of the position and orientation of a receiver having a size as small as several $cm^2$ can be measured. By associating these measurement values to an object coordinate system of the CG object, the CG object moves or rotates to follow movement or rotation of the receiver.

Using this receiver as an object manipulation device, the object manipulation device allows manipulation of the CG object.

The MR system is a technique that can present information to the observer as if a CG object were existing on a physical space. A work will be examined below wherein a small box is laid out in a large box without any lid. A physical interference between a CG object (to be referred to as CG object 1 hereinafter) of the small box which is associated with the object manipulation device and that (to be referred to as CG object 2 hereinafter) of the large box which is not associated with the object manipulation device is measured in real time. If an interference has occurred, a method of flickering the interfered portion, generating a sound, or kinesthetic sense presentation for moving the object manipulation device in a direction to avoid interference may be used.

However, the user's interestedness in this case is an interference between the interior of CG object 2 and CG object 1. In order to avoid an unwanted interference by the conventional method, CG object 1 must approach CG object 2 from its upper side.

Since both CG objects 1 and 2 are CG data and are not physical objects, no physical interference occurs on the physical space. Hence, it is desired to move CG object 1 into CG object 2 via a hole in the wall, and to then check an interference between CG objects 1 and 2. Then, the user need not perform any unwanted manipulation for approaching CG object 1 from the upper side of CG object 2.

The processing for checking an interference between CG objects requires relatively complicated processing. In some cases, as a result of the interference check processing, the display speed of an image to be presented to the user via the image observation device lowers. Consequently, it becomes difficult to perform the work itself for laying out CG object 1 in CG object 2.

SUMMARY OF THE INVENTION

It is an object of the present invention to provide a virtual reality presentation apparatus, virtual reality presentation method, and program, which can improve a system response immediately after an interference is detected without lowering CG data precision and interference determination precision, and can present natural virtual reality to the observer.

It is another object of the present invention to provide a technique for recording information associated with a collision so as to reproduce this collision later when the collision between virtual objects has occurred.

It is still another object of the present invention to improve the operability of a virtual object by checking the interference state between virtual objects at a suitable timing.

In order to achieve an object of the present invention, for example, a virtual reality presentation apparatus of the present invention comprises the following arrangement.

That is, a virtual reality presentation apparatus which displays an image generated based on three-dimensionally modeled CG objects, and displays an image according to a change in line of sight position of an observer, comprising:

interference detection unit adapted to detect an interference between the CG objects; and interference detection suppression unit adapted to suppress the interference detection within a detection suppression time period after detection of the interference by the interference detection unit.

In order to achieve an object of the present invention, for example, a virtual reality presentation method of the present invention comprises the following arrangement.

That is, a virtual reality presentation method which displays an image generated based on three-dimensionally modeled CG objects, and displays an image according to a change in line of sight position of an observer, comprising:

an interference detection step of detecting an interference between the CG objects; and an interference detection suppression step of suppressing the interference detection within a detection suppression time period after detection of the interference in the interference detection step.

In order to achieve an object of the present invention, for example, a program of the present invention comprises the following arrangement.

That is, a program for making a computer execute a virtual reality presentation method which displays an image generated based on three-dimensionally modeled CG objects, and displays an image according to a change in line of sight position of an observer, comprising:

an interference detection module for detecting an interference between the CG objects; and an interference detection suppression module for suppressing the interference detection within a detection suppression time period after detection of the interference by the interference detection module.

In order to achieve an object of the present invention, for example, a virtual reality presentation apparatus of the present invention comprises the following arrangement.

That is, a virtual reality presentation apparatus which displays an image generated based on three-dimensionally modeled CG objects, and displays an image according to a change in line of sight position of an observer, comprising:

moving unit adapted to move a CG object to be manipulated based on a manipulation of the observer;

check unit adapted to check an interference between the CG object to be moved and another CG object; and setting unit adapted to set a condition upon executing interference check processing again after the check unit checks the interference, and in that the check unit checks the interference based on the condition set by the setting unit.

In order to achieve an object of the present invention, for example, a virtual reality presentation method of the present invention comprises the following arrangement.

That is, a virtual reality presentation method which displays an image generated based on three-dimensionally modeled CG objects, and displays an image according to a change in line of sight position of an observer, comprising:

a moving step of moving a CG object to be manipulated based on a manipulation of the observer;

a check step of checking an interference between the CG object to be moved and another CG object; and a setting step of setting a condition upon executing interference check processing again after the interference is checked in the check step, and in that the interference is checked in the check step based on the condition set in the setting step.

In order to achieve an object of the present invention, for example, an image processing method of the present invention comprises the following arrangement.

That is, an image processing method comprising:

an acquisition step of acquiring a position and orientation of a viewpoint of an observer;

a layout step of laying out a plurality of virtual objects on a virtual space;

a generation step of generating an image viewed when the virtual space on which the plurality of virtual objects are laid out is seen from the viewpoint having the position and orientation acquired in the acquisition step;

an output step of externally outputting the image generated in the generation step; and a recording step of recording, when a collision between the virtual objects is detected, information associated with the collision in a memory.

In order to achieve an object of the present invention, for example, an image processing apparatus of the present invention comprises the following arrangement.

That is, an image processing apparatus comprising:

acquisition unit adapted to acquire a position and orientation of a viewpoint of an observer;

layout unit adapted to lay out a plurality of virtual objects on a virtual space;

generation unit adapted to generate an image viewed when the virtual space on which the plurality of virtual objects are laid out is seen from the viewpoint having the position and orientation acquired by the acquisition unit;

output unit adapted to externally output the image generated by the generation unit; and recording unit adapted to, when a collision between the virtual objects is detected, record information associated with the collision.

In order to achieve an object of the present invention, for example, an information processing method of the present invention comprises the following arrangement.

That is, an information processing method which comprises:

a first acquisition step of acquiring a position and orientation of a viewpoint of an observer;

a second acquisition step of acquiring a position and orientation of a pointing tool held by a hand of the observer;

a layout step of laying out a first virtual object on a virtual space at the position and orientation acquired in the second acquisition step; and a generation step of generating an image viewed when the virtual space including the first virtual object is seen from the viewpoint having the position and orientation acquired in the first acquisition step, the method further comprising:

a calculation step of calculating a moving velocity of the pointing tool;

a determination step of determining based on the moving velocity of the pointing tool whether or not an interference state between the first virtual object and a second virtual object laid out on the virtual space is to be checked; and a notification step of notifying occurrence of an interference when the first virtual object and the second virtual object interfere with each other as a result of checking the interference state between the first virtual object and the second virtual object.

In order to achieve an object of the present invention, for example, an information processing method of the present invention comprises the following arrangement.

That is, an information processing method which comprises:

a first acquisition step of acquiring a position and orientation of a viewpoint of an observer;

a second acquisition step of acquiring a position and orientation of a pointing tool held by a hand of the observer;

a layout step of laying out a first virtual object on a virtual space at the position and orientation acquired in the second acquisition step; and a generation step of generating an image viewed when the virtual space including the first virtual object is seen from the viewpoint having the position and orientation acquired in the first acquisition step, the method further comprising:

a determination step of determining based on a moving direction of the pointing tool and a positional relationship between the first virtual object and a second virtual object laid out on the virtual space whether or not an interference state between the first virtual object and the second virtual object is to be checked; and a notification step of notifying occurrence of an interference when the first virtual object and the second virtual object interfere with each other as a result of checking the interference state between the first virtual object and the second virtual object.

In order to achieve an object of the present invention, for example, an information processing method of the present invention comprises the following arrangement.

That is, an information processing method which comprises:

a first acquisition step of acquiring a position and orientation of a viewpoint of an observer;

a second acquisition step of acquiring a position and orientation of a pointing tool held by a hand of the observer;

a layout step of laying out a first virtual object on a virtual space at the position and orientation acquired in the second acquisition step; and a generation step of generating an image viewed when the virtual space including the first virtual object is seen from the viewpoint having the position and orientation acquired in the first acquisition step, the method further comprising:

an estimation step of estimating a load on processing for checking an interference state between the first virtual object and a second virtual object laid out on the virtual space;

a determination step of determining based on the load estimated in the estimation step whether or not the check processing is to be executed; and a notification step of notifying occurrence of an interference when the first virtual object and the second virtual object interfere with each other as a result of checking the interference state between the first virtual object and the second virtual object.

In order to achieve an object of the present invention, for example, an information processing apparatus of the present invention comprises the following arrangement.

That is, an information processing apparatus which comprises:

first acquisition unit adapted to acquire a position and orientation of a viewpoint of an observer;

second acquisition unit adapted to acquire a position and orientation of a pointing tool held by a hand of the observer;

layout unit adapted to lay out a first virtual object on a virtual space at the position and orientation acquired by the second acquisition unit; and generation unit adapted to generate an image viewed when the virtual space including the first virtual object is seen from the viewpoint having the position and orientation acquired by the first acquisition unit, the apparatus further comprising:

calculation unit adapted to calculate a moving velocity of the pointing tool;

determination unit adapted to determine based on the moving velocity of the pointing tool whether or not an interference state between the first virtual object and a second virtual object laid out on the virtual space is to be checked; and notification unit adapted to notify occurrence of an interference when the first virtual object and the second virtual object interfere with each other as a result of checking the interference state between the first virtual object and the second virtual object.

In order to achieve an object of the present invention, for example, an information processing apparatus of the present invention comprises the following arrangement.

That is, an information processing apparatus which comprises:

first acquisition unit adapted to acquire a position and orientation of a viewpoint of an observer;

second acquisition unit adapted to acquire a position and orientation of a pointing tool held by a hand of the observer;

layout unit adapted to lay out a first virtual object on a virtual space at the position and orientation acquired by the second acquisition unit; and generation unit adapted to generate an image viewed when the virtual space including the first virtual object is seen from the viewpoint having the position and orientation acquired by the first acquisition unit, the apparatus further comprising:

determination unit adapted to determine, based on a moving direction of the pointing tool and a positional relationship between the first virtual object and a second virtual object laid out on the virtual space, whether or not an interference state between the first virtual object and the second virtual object is to be checked; and notification unit adapted to notify occurrence of an interference when the first virtual object and the second virtual object interfere with each other as a result of checking the interference state between the first virtual object and the second virtual object.

In order to achieve an object of the present invention, for example, an information processing apparatus of the present invention comprises the following arrangement.

That is, an information processing apparatus which comprises:

first acquisition unit adapted to acquire a position and orientation of a viewpoint of an observer;

second acquisition unit adapted to acquire a position and orientation of a pointing tool held by a hand of the observer;

layout unit adapted to lay out a first virtual object on a virtual space at the position and orientation acquired by the second acquisition unit; and generation unit adapted to generate an image viewed when the virtual space including the first virtual object is seen from the viewpoint having the position and orientation acquired by the first acquisition unit, the apparatus further comprising:

estimation unit adapted to estimate a load on processing for checking an interference state between the first virtual object and a second virtual object laid out on the virtual space;

determination unit adapted to determine based on the load estimated by the estimation unit whether or not the check processing is to be executed; and notification unit adapted to notify occurrence of an interference when the first virtual object and the second virtual object interfere with each other as a result of checking the interference state between the first virtual object and the second virtual object.

In order to achieve an object of the present invention, for example, an information processing method of the present invention comprises the following arrangement.

That is, an information processing method having:

an acquisition step of acquiring a position of a pointing tool manipulated by an observer;

a layout step of laying out a first virtual object according to the position of the pointing tool; and a notification step of determining an interference state between the first virtual object and a second virtual object different from the first virtual object, and making notification according to the determination result, characterized in that the notification step is controlled in accordance with a moving velocity of the pointing tool.

In order to achieve an object of the present invention, for example, a virtual reality presentation apparatus of the present invention comprises the following arrangement.

That is, a virtual reality presentation apparatus which displays an image generated based on three-dimensionally modeled CG objects, and displays an image according to a change in line of sight position of an observer, comprising:

detection unit adapted to detect occurrence of a predetermined condition; and interference detection suppression unit adapted to suppress detection of an interference between the CG objects in accordance with the detection by the detection unit.

In order to achieve an object of the present invention, for example, a virtual reality presentation method of the present invention comprises the following arrangement.

That is, a virtual reality presentation method executed by a virtual reality presentation apparatus which displays an image generated based on three-dimensionally modeled CG objects, and displays an image according to a change in line of sight position of an observer, comprising:

a detection step of detecting occurrence of a predetermined condition; and an interference detection suppression step of suppressing detection of an interference between the CG objects in accordance with the detection in the detection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5D are views for explaining a collision between the two virtual objects shown in FIG. 4;

FIG. 6 is a flowchart of the processing for recording information associated with a collision upon detection of the collision between the virtual objects;

DETAILED DESCRIPTION OF THE PREFERRED EMBODIMENTS

Preferred embodiments of the present invention will now be described in detail in accordance with the accompanying drawings.

First Embodiment

Figure 1:
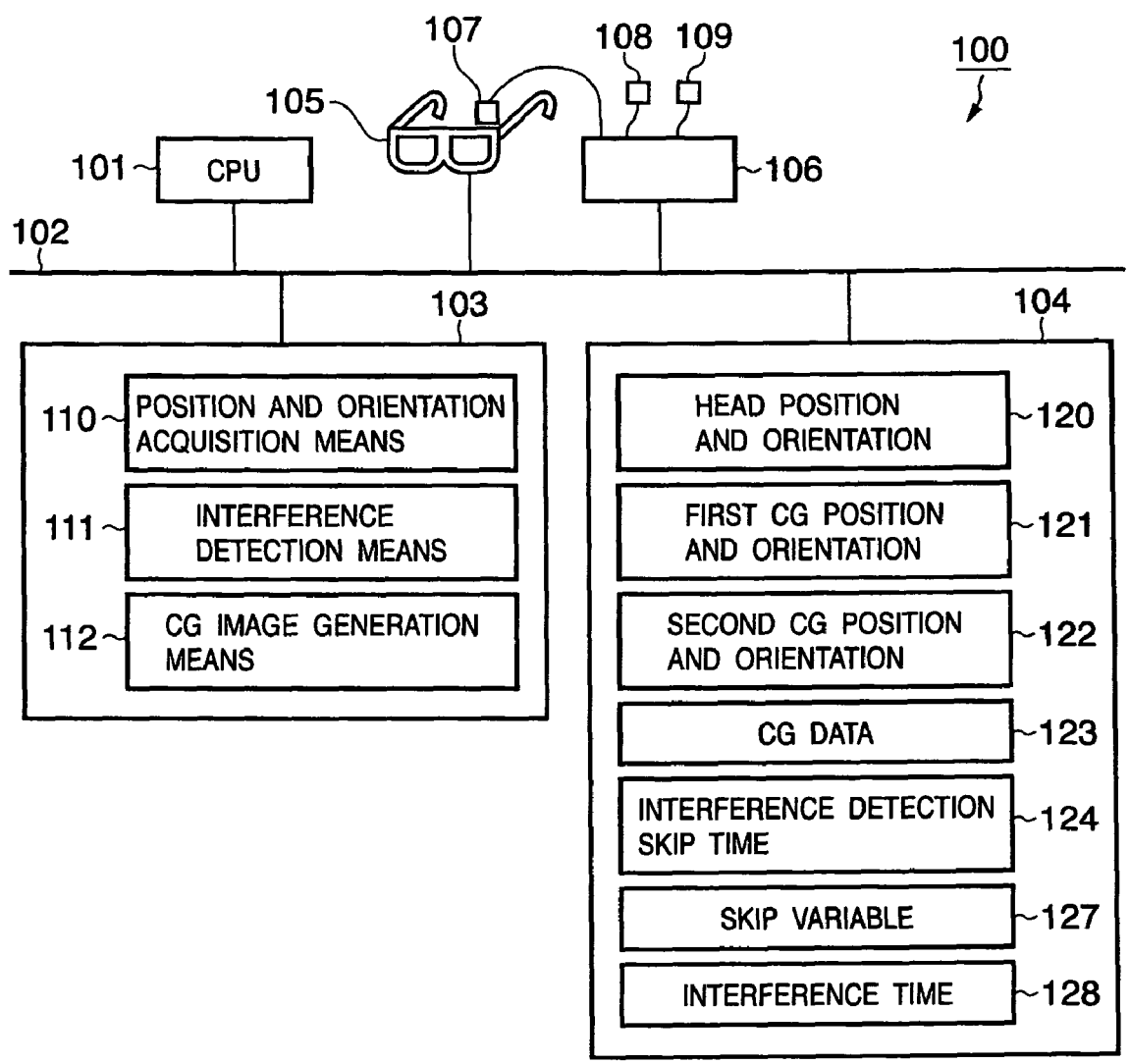
FIG. 1 is a schematic block diagram showing the arrangement of a virtual reality (VR) presentation apparatus according to an embodiment of the present invention.

FIG. 1 is a schematic block diagram showing the arrangement of a VR presentation apparatus according to the embodiment of the present invention.

Referring to FIG. 1, a VR presentation apparatus 100 comprises a CPU 101 which controls the overall apparatus, a memory 103 which stores various programs, a memory 104 which stores various data, an HMD 105 as an image display device, and a position and orientation sensor controller 106 having position and orientation sensors 107, 108, and 109. These components are connected to each other via a bus 102.

The position and orientation sensor 107 is attached to the HMD 105 to detect the position and orientation of the HMD 105, i.e., a change in line of sight position of the observer.

The position and orientation sensors 108 and 109 are used to detect manipulations of the observer (to be referred to as user's manipulations hereinafter), and the position and orientation of each CG object to be displayed on the virtual space are designated based on the outputs from these sensors. In this embodiment, the position and orientation of each CG object are designated based on the outputs from the position and orientation sensors by user's manipulations. Alternatively, other input means such as a keyboard, mouse, joystick, and the like may be used as long as designation can be made by user's manipulations.

The memory 103 stores programs, executed by CPU 101, for implementing position and orientation acquisition means 110 which acquires the positions and orientations of the position and orientation sensors 107, 108, and 109 using the position and orientation sensor controller 106, CG image generation means 112 for generating a CG image which is rendered so that the virtual space on which CG objects are laid out is observed from the position and orientation based on data in the memory 104, and interference detection means 111 which detects an interference between CG objects.

The memory 104 includes areas which store the following data: a head position and orientation area 120 which acquires and stores the position and orientation of the HMD 105, which are detected by the position and orientation sensor 107, from the position and orientation acquisition means 110; a first CG position and orientation area 121 which acquires and stores the position and orientation of the position and orientation sensor 108 from the position and orientation acquisition means 110; a second CG position and orientation area 122 which acquires and stores the position and orientation of the position and orientation sensor 109 from the position and orientation acquisition means 110; a CG data area 123 which records shape data of two CG objects that can be manipulated by the position and orientation sensors 108 and 109 as modeled data in advance; a SKIP variable area 127 which stores a logical value that is set to False when interference detection is made, and is set to True when interference detection is not made (skipped (suppressed)); an interference detection skip time area 124 which stores a variable used to designate a skip time interval of the interference detection immediately after the interference is detected; and an interference time area 128 which stores time at which the interference has occurred.

In this embodiment, various programs are saved in the memory 103, and various data are saved in the memory 104. Alternatively, all such programs and data may be saved in one memory.

The number of position and orientation sensors of the position and orientation sensor controller 106 is three. However, the number of sensors is not limited to this, and it may be increased/decreased in correspondence with the number of objects to be detected. The CG data area 123 records only shape data of two CG objects which can undergo user's manipulations by the position and orientation sensors 108 and 109 as those of CG objects. However, CG data area 123 may also record shape data of a CG object which does not undergo any user's manipulation.

Furthermore, in VR presentation processing shown in FIG. 2 to be described later, only an interference between the two CG objects is detected. If there are three or more position and orientation sensors which can undergo user's manipulations, processing about interferences among these CG objects may be made, and interference determination processing for a CG object which is not designated by user's manipulations may be made.

In this embodiment, only one HMD 105 is used. However, two or more HMDs may be prepared, and position and orientation sensors may be attached to these HMDs, so as to allow two or more observers to observe the virtual space.

Figure 2:
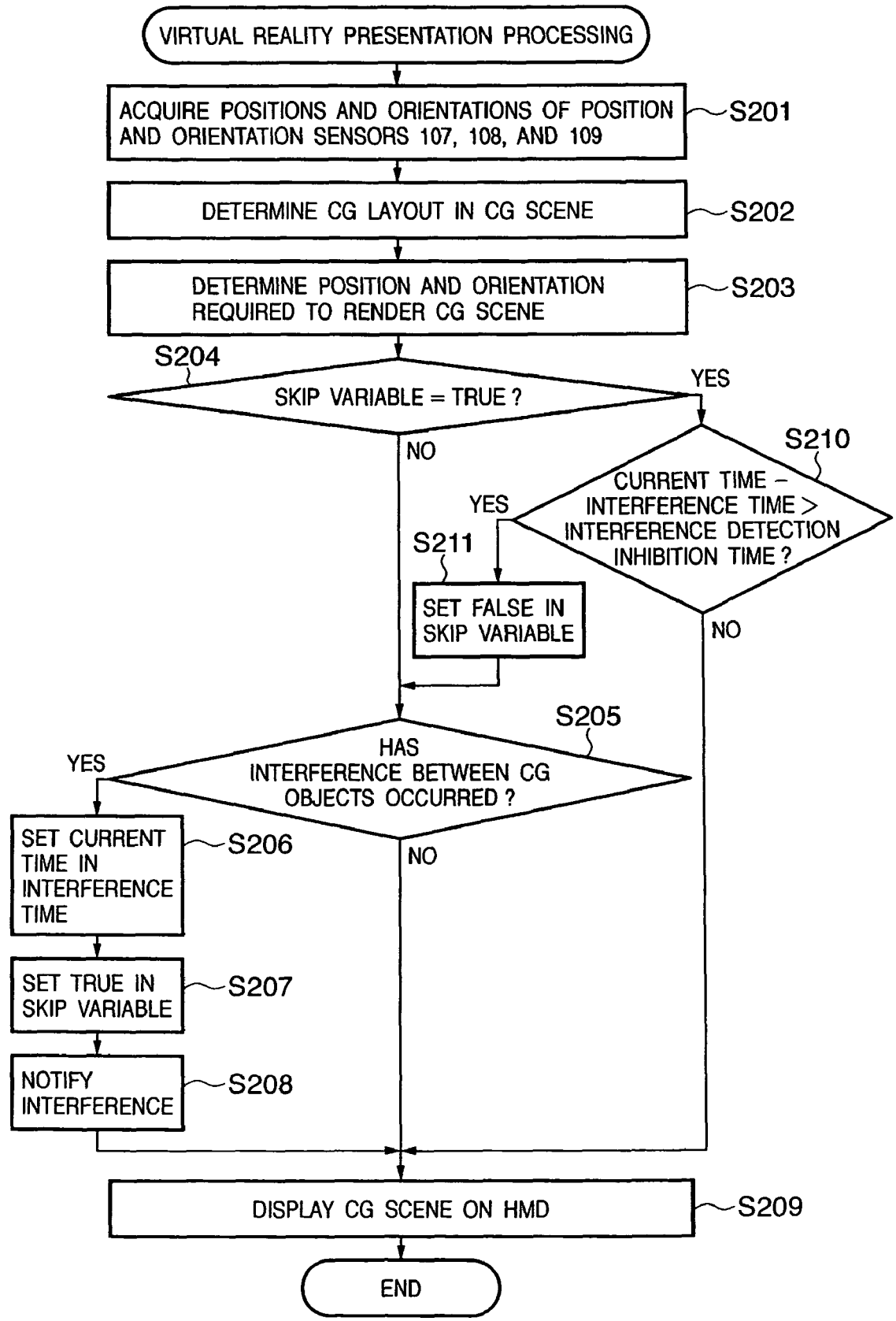
FIG. 2 is a flowchart showing the sequence of VR presentation processing executed by the VR presentation apparatus shown in FIG. 1.

FIG. 2 is a flowchart showing the sequence of VR presentation processing executed by the VR presentation apparatus 100 shown in FIG. 1.

This flowchart shows the processing executed when the VR representation apparatus 100 presents virtual reality by displaying a CG image for one frame associated with the position and orientation relationship between the two CG objects based on user's manipulations and the position and orientation of the HMD 105 detected by the position and orientation sensor 107. By repeating this processing, a CG image on the virtual space according to the behavior of the observer who wears the HMD 105 can be displayed on the HMD as a moving image.

Before this processing is executed for the first time, initial values are set. More specifically, False data is set in the SKIP variable area 127 in the memory 104, an appropriate value (e.g., 1 sec) is set in the interference detection skip time area 124 in the memory 104, and the setting time of initial values is set in the interference time area 128 in the memory 104.

Referring to FIG. 2, the positions and orientations of the position and orientation sensors 107, 108, and 109 are acquired first using the position and orientation acquisition means 110 (step S201), and the acquired positions and orientations are respectively stored in the head position and orientation area 120, first CG position and orientation area 121, and second CG position and orientation area 122 of the memory 104. After that, the CG data 123 is set according to the positions and orientations stored in the first and second CG position and orientation areas 121 and 122, thus determining a CG layout in a CG scene (virtual space) (step S202). As a result, when the observer manipulates the CG layout using the position and orientation sensors 108 and 109, the observer can feel as if he or she were moving the CG objects on the virtual space.

After that, the position and orientation upon rendering a CG for one frame which forms the CG scene are set according to the data in the head position and orientation area 120 in the memory 104. Since the CG data 123 is set based on these position and orientation, those required to render the CG scene (virtual space) are determined (step S203).

It is checked if the SKIP variable 127 is True or False (step S204). If this variable is False, it is determined that interference detection is not skipped, and it is checked using the interference detection means 111 if an interference between the two CG objects, the positions and orientations of which are designated by the manipulations of the observer in step S201, has occurred (step S205).

If it is determined as a result of checking in step S205 that the interference has occurred, the current time is set in the interference time 128 in the memory 104 (step S206), and the SKIP variable 127 is set to True (step S207), thus making interference notification (step S208). Note that the interference notification in step S208 notifies the observer that the two CG objects are in an interference state. For example, this notification is attained by producing a sound from a loudspeaker (not shown) or changing the colors of the CG objects displayed on the HMD 105.

Next, the CG image generation means 121 generates the CG scene based on the position and orientation to be rendered, which are determined in step S203, and displays that CG scene on the HMD 105 (step S209), thus ending this processing for one frame. In this manner, the HMD 105 displays an image which is rendered so that the virtual space on which the CG objects are laid out is observed from the position and orientation stored in the head position and orientation area 120.

On the other hand, if it is determined as a result of checking in step S204 that the SKIP variable is True, it is checked if the difference between the current time and the interference time 128 set in step S206 exceeds the interference detection skip time 124 (step S210).

If it is determined as a result of checking in step S210 that the difference between the current time and the interference time 128 exceeds the interference detection skip time 124, the SKIP variable 127 is set to False (step S211), and the flow advances to step S205 to perform interference detection.

On the other hand, if it is determined as a result of checking in step S210 that the difference between the current time and the interference time 128 does not exceed the interference detection skip time 124, the SKIP variable 127 remains True, and the flow advances to step S209 without any interference detection (by skipping it), thus ending this processing for one frame.

According to the processing shown in FIG. 2, after the position and orientation required to render a CG scene (virtual space) for one frame are determined (step S203), if the CG objects are in an interference state in the processing immediately before this processing (YES in step S204) and the difference between the current time and the interference time 128 which is set upon determining the interference state does not exceed the interference detection skip time 124 (NO in step S210), the CG image generation means 112 generates the CG scene (virtual space) for one frame based on the determined position and orientation without checking if an interference has occurred between the CG objects (step S209). Therefore, a system response immediately after the interference is detected can be improved without lowering the CG data precision and interference determination precision, and natural virtual reality can be presented to the observer.

In this embodiment, a fixed value is set for the interference detection skip time 124 before the beginning of all processes. Alternatively, input means may be separately prepared, and the observer may change this value while experiencing virtual reality.

Also, the processing time required to check if an interference has occurred may be measured, and the value of the interference detection skip time 124 may be automatically changed based on the measured value. For example, if the measured processing time is short, the interference detection skip time 124 may be shortened (or it may be set to zero) to check for each frame at a frequency of occurrence close to it if the interference has occurred. On the other hand, if the measured processing time is long, the interference detection skip time 124 may be prolonged. In this manner, an unwantedly long interference detection skip time 124 can be prevented from being set for data which has a short measured processing time and a light load on the interference determination processing.

An interference between CG data to be manipulated by the user is checked. Alternatively, an interference between CG data to be manipulated by the user and that which is laid out on the virtual space and is not to be manipulated by the user may be checked.

Second Embodiment

Figure 3:
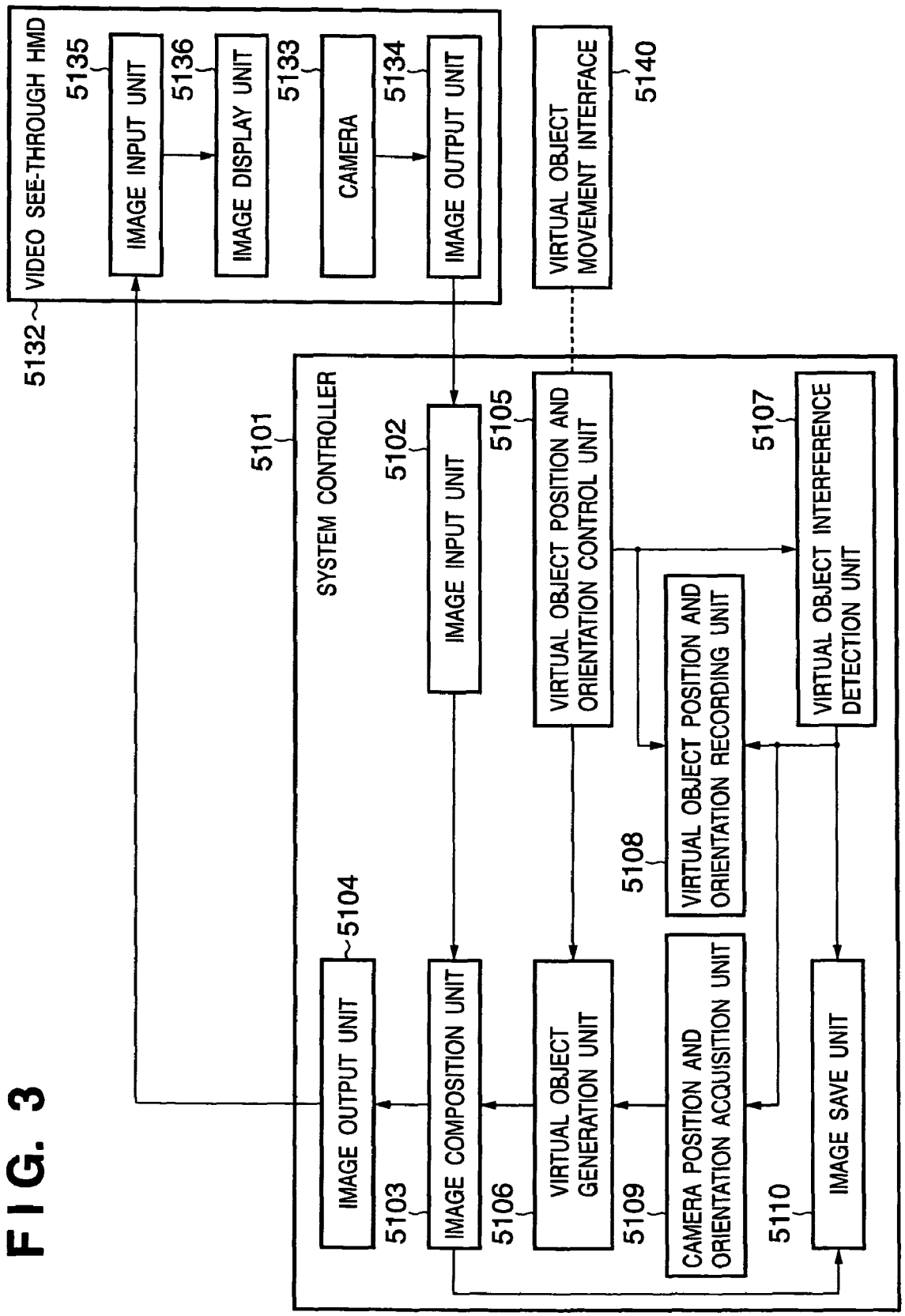
FIG. 3 is a block diagram showing the functional arrangement of a system for allowing the observer to experience an MR space generated by superimposing a virtual space on a physical space.

FIG. 3 is a block diagram showing the functional arrangement of a system that allows the observer to experience an MR space obtained by superimposing a virtual space onto a physical space. As shown in FIG. 3, the system according to this embodiment comprises a system controller 5101, virtual object movement interface 5140, and video see-through HMD 5132.

The video see-through HMD 5132 will be explained first. The video see-through HMD 5132 comprises an image input unit 5135, image display unit 5136, camera 5133, and image output unit 5134.

The camera 5133 is used to capture a moving image of the physical space, and captured frame images are output to the system controller 5101 via the image output unit 5134. Note that the camera 5133 will also be referred to as a "viewpoint of the observer" hereinafter.

The image input unit 5135 receives an image signal output from the system controller 5101, and displays an image according to the received image signal on the image display unit 5136. Since the image display unit 5136 is attached to the video see-through HMD 5132 so as to be located in front of the eyes of the observer who wears the video see-through HMD 5132 on the head, this observer observes an image based on the image signal output from the system controller 5101.

Note that the position and orientation of this video see-through HMD 5132 are acquired by the system controller 5101 in processing to be described later.

Next, the virtual object movement interface 5140 will be described. The position and orientation of the virtual object movement interface 5140 can be freely changed when it is held by the hand of the observer, and are acquired by the system controller 5101 in processing to be described later. In this embodiment, one or more virtual objects are laid out at the position and orientation of this virtual object movement interface 5140.

The system controller 5101 will be described below. As shown in FIG. 3, the system controller 5101 comprises an image input unit 5102, image composition unit 5103, image output unit 5104, virtual object position and orientation control unit 5105, virtual object generation unit 5106, virtual object interference detection unit 5107, virtual object position and orientation recording unit 5108, camera position and orientation acquisition unit 5109, and image save unit 5110.

The image input unit 5102 receives an image of the physical space output from the image output unit 5134 of the video see-through HMD 5132, and outputs it to the image composition unit 5103.

The camera position and orientation acquisition unit 5109 executes processing for acquiring the position and orientation of the viewpoint. Various processes for acquiring the position and orientation of the viewpoint may be used, and the present invention is not particularly limited to a specific one. For example, the following method may be used.

A magnetic sensor is attached to the video see-through HMD 5132 at a position and orientation to have a known position and orientation relationship (bias) with the camera 5133, and measures the position and orientation of itself on a coordinate system (sensor coordinate system) which has the position of a magnetic field source as an origin, and three axes which are perpendicular to each other at this origin as x-, y-, and z-axes. In this case, the camera position and orientation acquisition unit 5109 receives a "signal indicating the position and orientation of the magnetic sensor on the sensor coordinate system" output from this magnetic sensor, and acquires it as data. By adding the bias data to this data, the position and orientation of the viewpoint on the sensor coordinate system can be calculated.

On the other hand, the virtual object position and orientation control unit 5105 acquires the position and orientation of the virtual object movement interface 5140. Various acquisition methods of the position and orientation of the virtual object movement interface 5140 may be used. For example, the following method may be used.

A magnetic sensor is attached to the position and orientation of the virtual object movement interface 5140, and measures the position and orientation of itself on the sensor coordinate system. In this case, the virtual object position and orientation control unit 5105 receives a "signal indicating the position and orientation of the virtual object movement interface 5140 on the sensor coordinate system" output from the virtual object movement interface 5140, and acquires it as data.

In another method, the position and orientation of the virtual object movement interface 5140 may be acquired by calculating its position and orientation using an image received by the image input unit 5102 from the image output unit 5134. With any method, the virtual object position and orientation control unit 5105 acquires the position and orientation of the virtual object movement interface 5140.

Also, the virtual object position and orientation control unit 5105 holds data of the positions and orientations of a plurality of virtual objects to be laid out on the virtual space. When the virtual object position and orientation control unit 5105 acquires the position and orientation of the virtual object movement interface 5140, it executes processing for updating the position and orientation of each virtual object associated with this virtual object movement interface 5140 by the acquired position and orientation.

As for each virtual object which is not associated with the virtual object movement interface 5140, its position and orientation may be fixed, or they may be updated according to predetermined rules of motion. In any case, the positions and orientations of the virtual objects which are associated with the virtual object movement interface 5140 and those which are not associated with it are managed by the virtual object position and orientation control unit 5105.

Since the virtual object position and orientation recording unit 5108 sequentially receives the position and orientation of the viewpoint acquired by the camera position and orientation acquisition unit 5109, and those of respective virtual objects managed by the virtual object position and orientation control unit 5105, it executes processing for recording the received position and orientation of the viewpoint and those of the respective virtual objects as a set together with the current time.

The virtual object interference detection unit 5107 executes processing for detecting a collision between virtual objects with reference to the "positions and orientations of virtual objects" managed by the virtual object position and orientation control unit 5105. For example, the virtual object interference detection unit 5107 checks if each virtual object associated with the virtual object movement interface 5140 collides against a virtual object which is not associated with it. Since the processing for checking if virtual objects collide against each other is known to those who are skilled in the art, a detailed description thereof will be omitted. For example, if the distance between the positions of virtual objects is equal to or smaller than a predetermined distance, it may be determined that these virtual objects have collided against each other. Also, if each virtual object is made up of polygons, intersection determination may be made for respective polygons, and if polygons which intersect with each other are found, a collision may be determined.

When the virtual object interference detection unit 5107 determines that colliding virtual objects are found, it sends a message that advices accordingly to the virtual object position and orientation recording unit 5108 and image composition unit 5103.

Upon reception of the message indicating that the colliding virtual objects are detected from the virtual object interference detection unit 5107, the virtual object position and orientation recording unit 5108 further executes recording processing of the following information.

information for identifying each individual colliding virtual object (e.g., an ID such as an identification number or the like)

information indicating a colliding part of each individual virtual object (e.g., a number used to identify a colliding polygon, information indicating a colliding part)

That is, the virtual object position and orientation recording unit 5108 always executes the processing for recording set data. Upon reception of the collision detection message from the virtual object interference detection unit 5107, the recording unit 5108 records the above two pieces of information ("information for identifying each individual colliding virtual object" and "information indicating a colliding part of each individual virtual object") in addition to the set data.

Therefore, upon reception of the collision detection message from the virtual object interference detection unit 5107, the virtual object position and orientation recording unit 5108 executes processing for recording set data including the position and orientation of the viewpoint, those of respective virtual objects, the current time, information for identifying each individual colliding virtual object, and information indicating a colliding part of each individual virtual object.

Note that the information to be recorded is not limited to such specific information, and information required to reproduce an image of the virtual space at the time of collision may be recorded.

The virtual object generation unit 5106 lays out virtual objects at their positions and orientations managed by the virtual object position and orientation control unit 5105. Then, the generation unit 5106 executes processing for generating an image which is seen when the virtual space on which the virtual objects are laid out is observed from the viewpoint having the position and orientation acquired by the camera position and orientation acquisition unit 5109. Since the processing for generating an image of the virtual space which is seen from the viewpoint having the predetermined position and orientation is known to those who are skilled in the art, a description thereof will be omitted.

The image of the virtual space generated by the virtual object generation unit 5106 is output to the image composition unit 5103. The image composition unit 5103 generates an image of an MR space by superimposing the image of the virtual space generated by the virtual object generation unit 5106 on the image of the physical space received from the image input unit 5102, and outputs the generated image to the image input unit 5135 of the video see-through HMD 5132 via the image output unit 5104. Since the image input unit 5135 displays the received image of the MR space on the display unit 5136, the image of the MR space is displayed in front of the eyes of the observer who wears the video see-through HMD 5132 on the head.

On the other hand, upon reception of the message indicating that the colliding virtual objects are detected from the virtual object interference detection unit 5107, the image composition unit 5103 executes processing for recording the generated image of the MR space in the image save unit 5110.

That is, the system controller 5101 executes processing for generating an image of the virtual space which is seen from the viewpoint, superimposing the generated image onto the image of the physical space which is seen from the viewpoint, and outputting the composite image to the video see-through HMD 5132. When virtual objects collide against each other, the system controller 5101 records information required to reproduce an image indicating the collision state.

Figure 4:
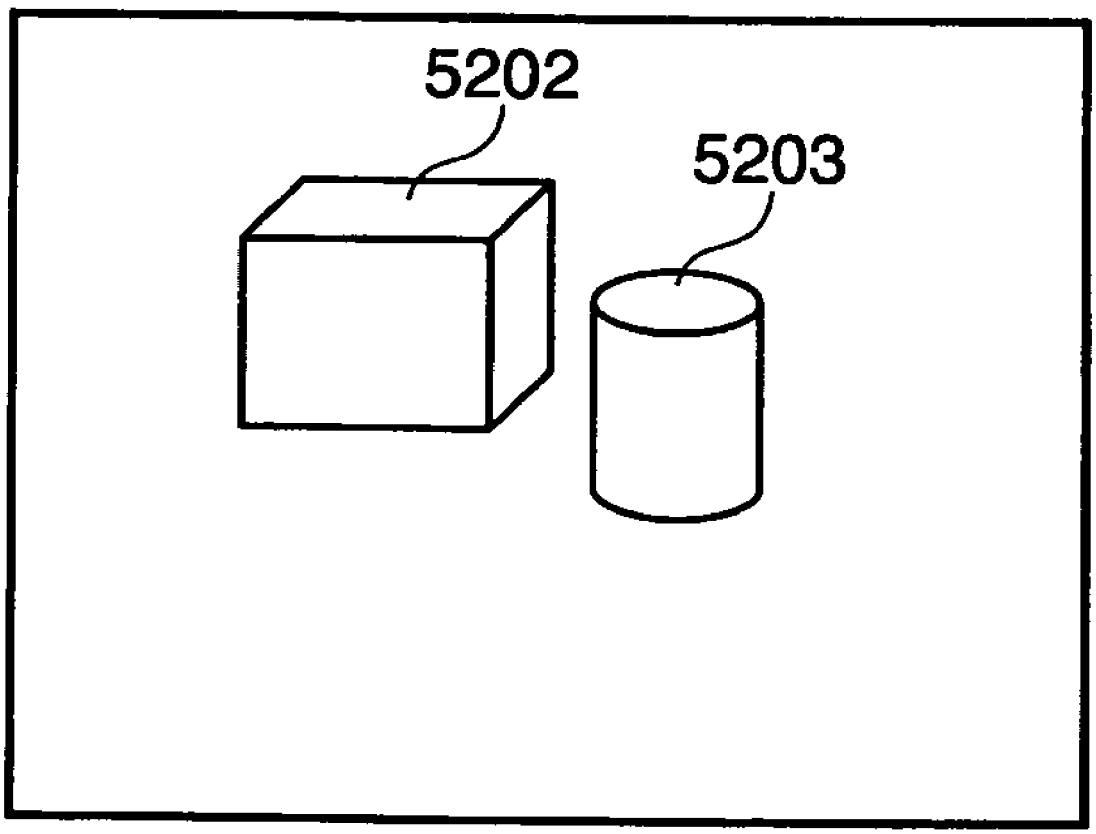
FIG. 4 shows two virtual objects used as an explanatory example of a collision between the virtual objects.

A collision between virtual objects will be described below. FIG. 4 shows two virtual objects used as an explanatory example of the collision between virtual objects. Referring to FIG. 4, reference numerals 5202 and 5203 denote virtual objects, which are laid out at positions and orientations managed by the virtual object position and orientation control unit 5105. In the following description, the virtual object 5203 is associated with the virtual object movement interface 5140. That is, the virtual object 5203 is laid out at the position and orientation of the virtual object movement interface 5140. When the observer changes the position and orientation of the virtual object movement interface 5140 by holding it with the hand, the position and orientation of the virtual object 5203 change accordingly. Also, assume that the position and orientation of the virtual object 5202 are fixed.

FIGS. 5A to 5D are views for explaining a collision between the two virtual objects shown in FIG. 4. Assume that the position of the virtual object 5203 is moved in the order of FIG. 5A→FIG. 5B→FIG. 5C→FIG. 5D. Also, assume that the virtual object 5203 collides against the virtual object 5202 at the timing shown in FIG. 5B and that shown in FIG. 5C.

In this case, the virtual object position and orientation recording unit 5108 executes processing for recording the positions and orientations of the virtual objects 5202 and 5203, information indicating colliding parts, the position and orientation of the viewpoint, the current time, and information used to identify the virtual objects 5202 and 5203 in the state shown in FIG. 5B, and the image composition unit 5103 executes processing for recording the image shown in FIG. 5B in the image save unit 5110.

After that, the virtual object position and orientation recording unit 5108 executes processing for recording the positions and orientations of the virtual objects 5202 and 5203, information indicating colliding parts, the position and orientation of the viewpoint, the current time, and information used to identify the virtual objects 5202 and 5203 in the state shown in FIG. 5C, and the image composition unit 5103 executes processing for recording the image shown in FIG. 5C in the image save unit 5110.

FIG. 6 is a flowchart of a series of processes described above, i.e., processing for recording information associated with a collision when the collision between virtual objects is detected.

Since the camera position and orientation acquisition unit 5109 sequentially acquires the position and orientation of the viewpoint, the virtual object position and orientation recording unit 5108 executes processing for recording the position and orientation acquired by the camera position and orientation acquisition unit 5109 (step S5401). Subsequently, the virtual object position and orientation recording unit 5108 executes processing for recording the positions and orientations of virtual objects managed by the virtual object position and orientation control unit 5105 together with the data recorded in step S5401 as a set (step S5402). Also, in either of steps S5401 and S5402, the current time is also recorded as a set.

The virtual object interference detection unit 5107 checks a collision between virtual objects (step S5403). If no collision between virtual objects is detected, the flow jumps to step S5406. However, if the collision is detected, the flow advances to step S5404, and the detection message is sent to the virtual object position and orientation recording unit 5108. Hence, the virtual object position and orientation recording unit 5108 executes processing for recording information associated with an interference, i.e., information used to identify each individual colliding virtual object and information indicating a colliding part of each individual object together with the data recorded in steps S5401 and S5402 as a set (step S5404).

Next, the virtual object generation unit 5106 and image composition unit 5103 generate an image of the MR space, as described above. In this case, upon reception of the collision detection message from the virtual object interference detection unit 5107, the image composition unit 5103 executes processing for recording the generated image of the MR space in the image save unit 5110 (step S5405).

The flow returns to step S5401 unless an end instruction of this processing is input, thus repeating the subsequent processing.

In the aforementioned processing, an optical see-through HMD may be used in place of the video see-through HMD 5132. In this case, the image input unit 5102 and image composition unit 5103 in the system controller 5101 can be omitted. An image of the virtual space generated by the virtual object generation unit 5106 is output to the optical see-through HMD via the image output unit 5104. Also, upon reception of the collision detection message, this image of the virtual space is recorded in the image save unit 5110.

Third Embodiment

Figure 7:
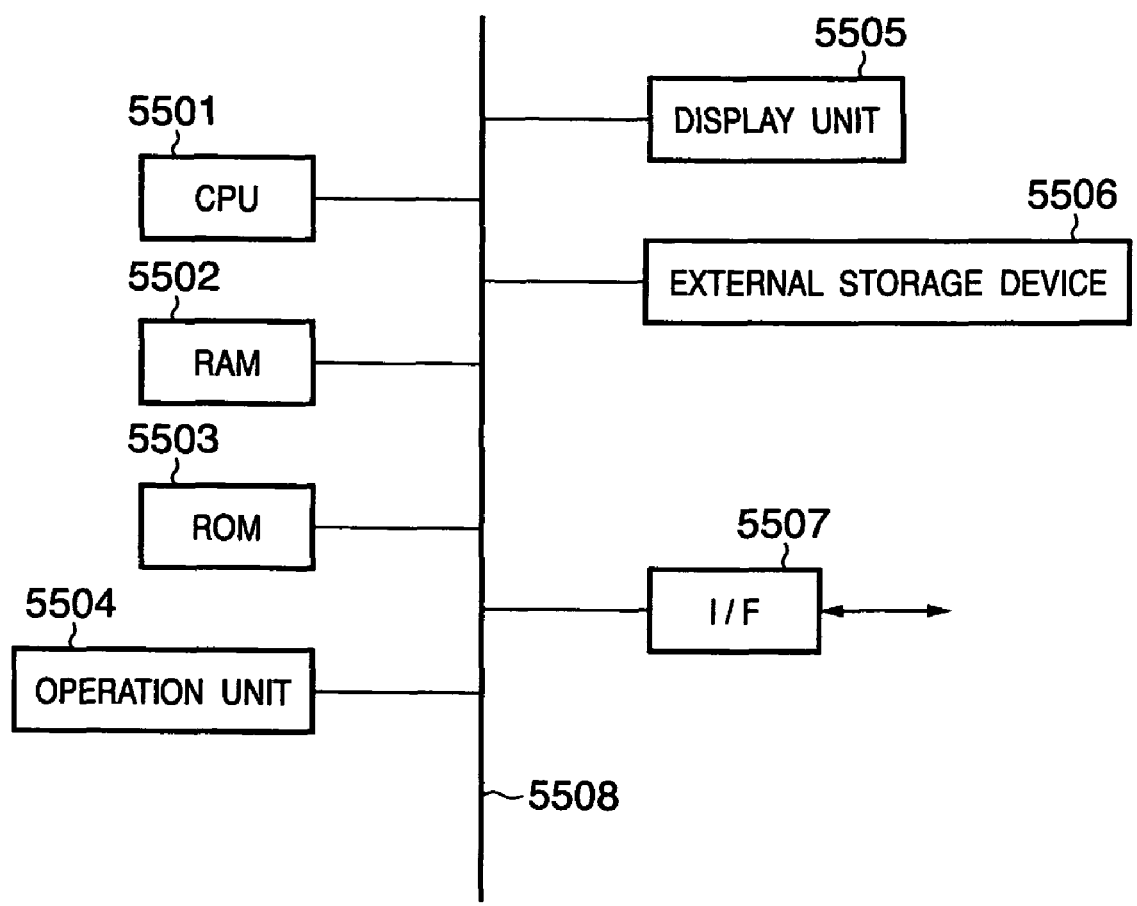
FIG. 7 is a block diagram showing the hardware arrangement of a computer which can be applied to a system controller 5101.

FIG. 7 is a block diagram showing the hardware arrangement of a computer which can be applied to the system controller 5101.

Reference numeral 5501 denotes a CPU which controls the entire computer using programs and data stored in a RAM 5502 and ROM 5503, and executes the above processes as those to be executed by the system controller 5101.

Reference numeral 5502 denotes a RAM which can provide various areas as needed, such as an area for temporarily storing programs and data loaded from an external storage device 5506, an area for temporarily recording data externally received via an I/F 5507, a work area used by the CPU 5501 upon executing various processes, and the like.

Reference numeral 5503 denotes a ROM which stores a boot program, setting data of this computer, and the like.

Reference numeral 5504 denotes an operation unit which comprises a keyboard, mouse, and the like. When the operator of this computer operates the operation unit 5504, he or she can input various instructions to the CPU 5501.

Reference numeral 5505 denotes a display unit which comprises a CRT, liquid crystal display, or the like, and can display the processing results of the CPU 5501 by means of images, characters, and the like.

Reference numeral 5506 denotes an external storage device which serves as a large-capacity information storage device represented by a hard disk drive. The external storage device 5506 saves an OS (operating system), and programs and data for making the CPU 5501 execute respective processes to be executed by the system controller 5101. These programs and data are loaded onto the RAM 5502 as needed under the control of the CPU 5501.

Reference numeral 5507 denotes an I/F to which the video see-through HMD 5132 and the virtual object movement interface 5140 are connected. Depending on the position and orientation acquisition method of the video see-through HMD 5132 and the virtual object movement interface 5140, devices (e.g., a control device of magnetic sensors, magnetic sensors themselves) must be connected to this I/F 5507.

Reference numeral 5508 denotes a bus which interconnects the aforementioned units.

That is, when the computer with the arrangement shown in FIG. 7 is applied to the system controller 5101, the RAM 5502 and external storage device 5506 are used as a memory required to record information of the respective units which form the system controller 5101 shown in FIG. 3. Other units (the image input unit 5102, image composition unit 5103, image output unit 5104, virtual object position and orientation control unit 5105, virtual object generation unit 5106, virtual object interference detection unit 5107, virtual object position and orientation recording unit 5108, and camera position and orientation acquisition unit 5109) are implemented by programs. That is, when such programs are loaded from the external storage device 5506 onto the RAM 5502 as needed and the CPU 5501 executes the loaded programs, the CPU 5501 executes the operations of the above units, i.e., the image input unit 5102, image composition unit 5103, image output unit 5104, virtual object position and orientation control unit 5105, virtual object generation unit 5106, virtual object interference detection unit 5107, virtual object position and orientation recording unit 5108, and camera position and orientation acquisition unit 5109.

Fourth Embodiment

Figure 8:
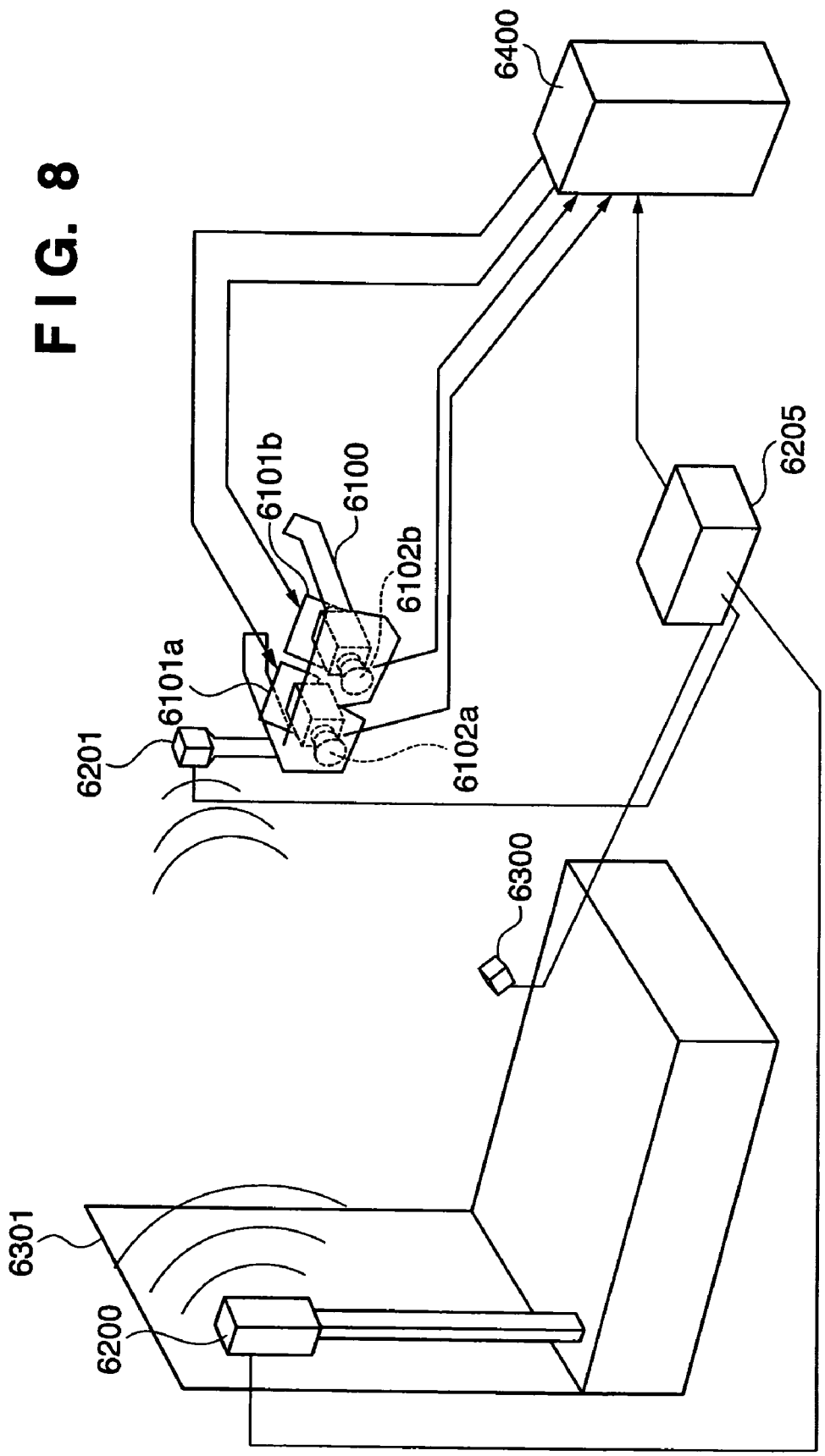
FIG. 8 is a view showing the outer appearance of a system that presents an MR space generated by superimposing a virtual space on a physical space to the observer (user)

FIG. 8 is a view showing the outer appearance of a system which provides an MR space obtained by superimposing a virtual space onto a physical space to the observer (user).

Referring to FIG. 8, reference numeral 6200 denotes a transmitter which generates a magnetic field. Reference numeral 6100 denotes a head-mounted display device (to be abbreviated as an HMD hereinafter), which is mounted on the head of the observer to present images on a space (MR space) formed by combining the physical space and virtual space to positions before eyes of the observer. The HMD 6100 comprises cameras 6102a and 6102b, display devices 6101a and 6101b, and a magnetic receiver 6201.

The cameras 6102a and 6102b respectively capture moving images of the physical space viewed from the right and left eyes of the observer who wears the HMD 6100 on the head. The captured frame images are output to a computer 6400.

The display devices 6101a and 6101b are mounted on the HMD 6100 to be located in front of the right and left eyes when the observer wears the HMD 6100 on the head, and display images based on image signals output from the computer 6400. Therefore, the images generated by the computer 6400 are provided to positions in front of the right and left eyes of the observer.

The magnetic receiver 6201 detects a change in magnetic field generated by the transmitter 6200, and outputs the detection result signal to a position and orientation measuring device 6205. The detection result signal indicates a change in magnetic field which is detected in correspondence with the position and orientation of the magnetic receiver 6201 on a coordinate system (to be referred to as a sensor coordinate system hereinafter) which has the position of the transmitter 6200 as an origin, and three axes perpendicular to each other at the position of this origin as x-, y-, and z-axes.

The position and orientation measuring device 6205 calculates the position and orientation of the magnetic receiver 6201 on the sensor coordinate system, and outputs data indicating the calculated position and orientation to the computer 6400.

Figure 9:
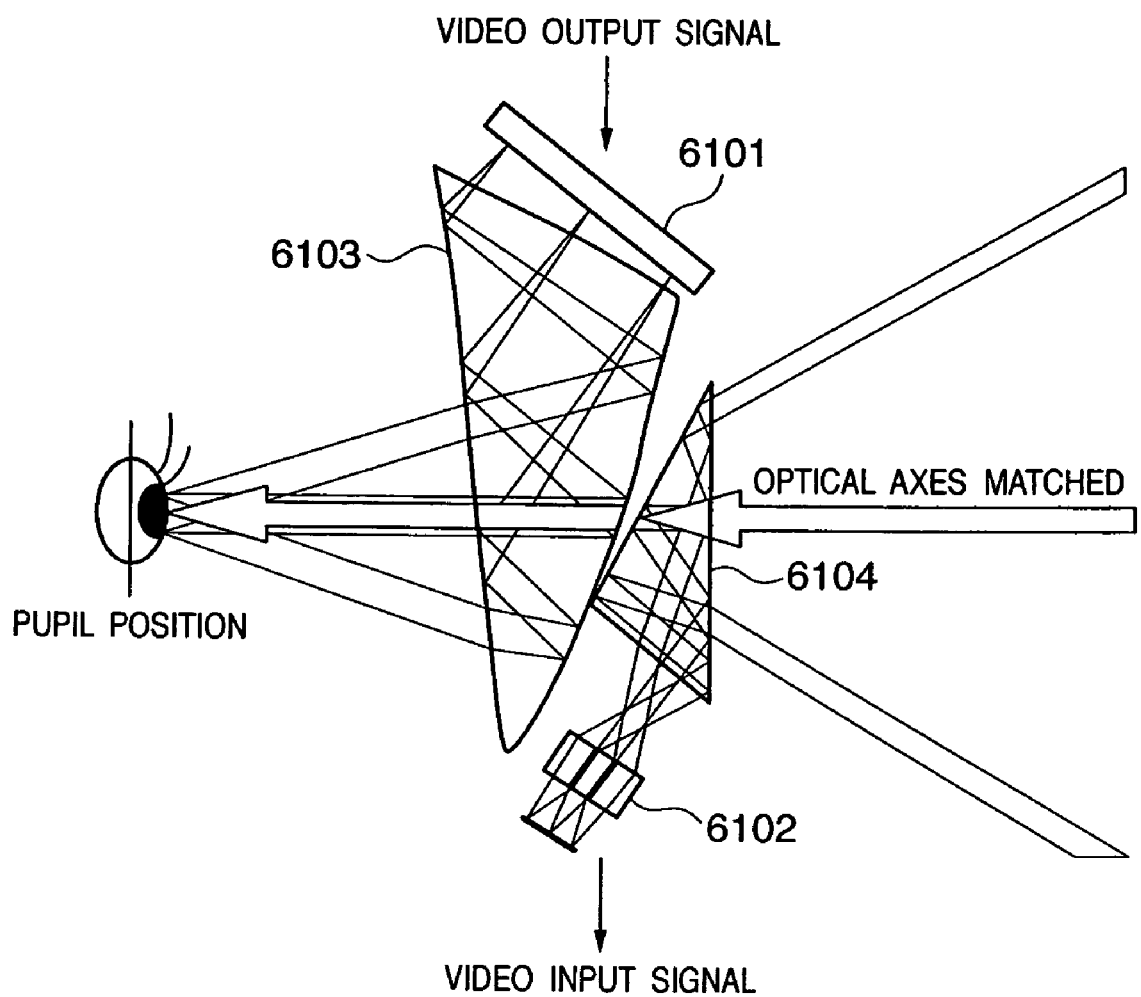
FIG. 9 is a view showing the detailed arrangement of an HMD 6100.

FIG. 9 shows the detailed structure of the HMD 6100.

Reference numeral 6101 denotes a video display device, which comprises a compact liquid crystal display device of 0.5 to several inches. Reference numeral 6103 denotes a sculptured surface prism which serves as a lens that scales up an image of the video display device 6101. With this arrangement, an image displayed on the video display device 6101 is presented as an image equivalent to that of 90 inches to, e.g., a position 2 m ahead of the observer.

Reference numeral 6102 denotes a video input device which comprises an imaging device such as a CCD camera, CMOS camera, or the like. Reference numeral 6104 denotes an imaging system prism which serves as a lens for converging light on the physical space to the video input device 6102. Since the imaging system prism 6104 is arranged outside the sculptured surface prism 6103 so that their optical axes agree with each other, the parallax between an image input by the video input device 6102 and that displayed on the video display device 6101 is removed, thus naturally reproducing an image of the physical space.

Referring back to FIG. 8, reference numeral 6300 denotes a pointing tool to be held by the hand of the observer. The pointing tool 6300 is a magnetic receiver itself or a tool that incorporates the magnetic receiver. For the sake of simplicity, the pointing tool 6300 is the magnetic receiver itself. However, even when the pointing tool 6300 incorporates the magnetic receiver, the gist of the following description remains unchanged.

The pointing tool 6300 (magnetic receiver) detects a change in magnetic field according to the position and orientation of itself on the sensor coordinate system, and outputs a detection result signal (in other words, a signal indicating the position and orientation of the pointing tool 6300 itself on the sensor coordinate system) to the position and orientation measuring device 6205. Therefore, the position and orientation measuring device 6205 can calculate the position and orientation of the pointing tool 6300 on the sensor coordinate system, and outputs data indicating the calculated position and orientation to the computer 6400. Therefore, even when the observer changes the position and orientation of the pointing tool 6300 by holding that tool with the hand, the position and orientation of the pointing tool 6300 are always measured by the pointing tool 6300 itself, and the measured position and orientation are input to the computer 6400.

Reference numeral 6301 denotes a table.

Figure 15:
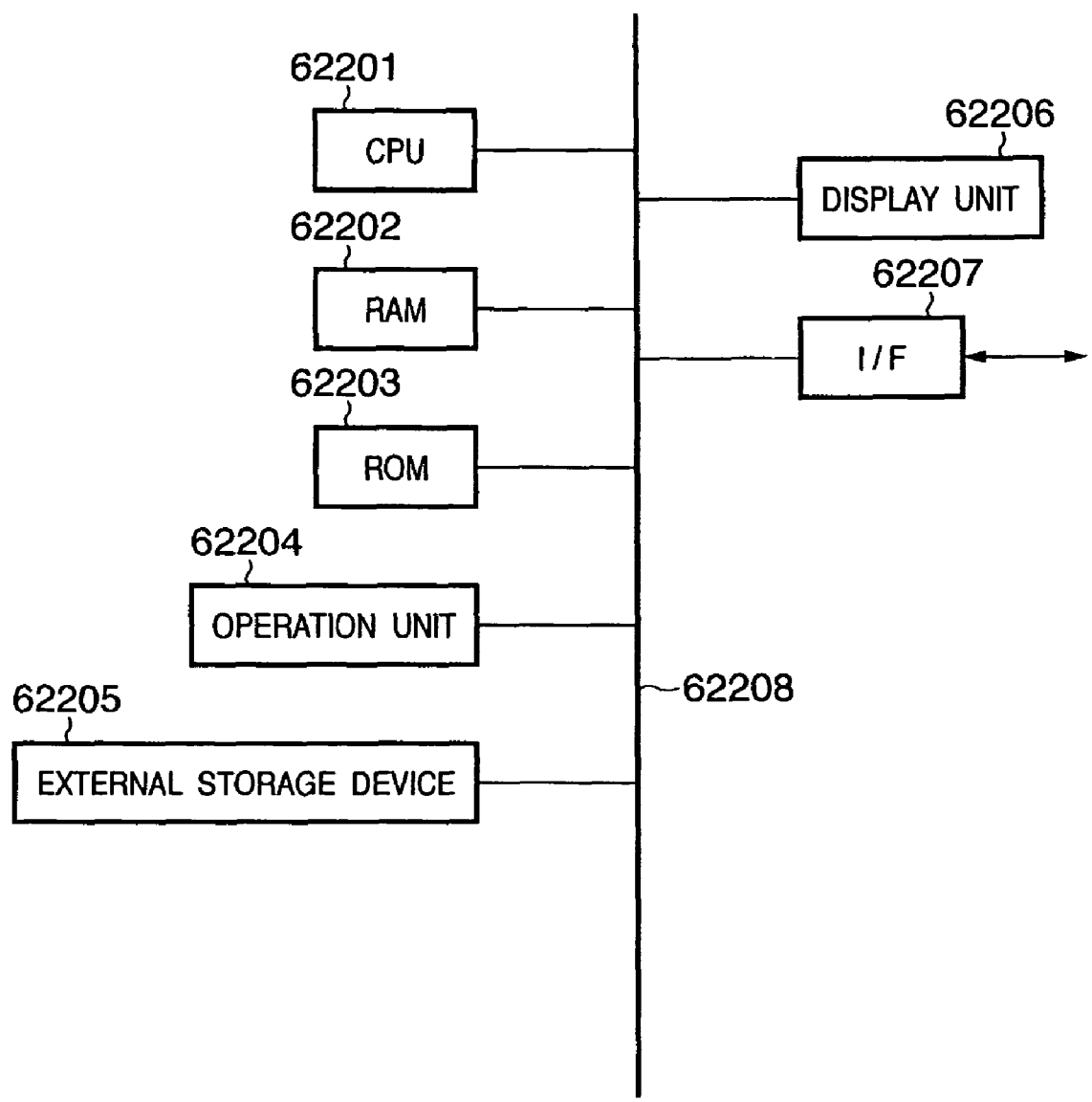
FIG. 15 is a block diagram showing the hardware arrangement of the computer 6400.

Reference numeral 6400 denotes a computer which generates image signals to be output to the display devices 6101*a* and 6101*b* of the HMD 6100, receives data from the position and orientation measuring device 6205, and executes processing such as management of received data and the like. This computer generally comprises a PC (personal computer), WS (workstation), or the like. FIG. 15 is a block diagram showing the hardware arrangement of this computer 6400.

Reference numeral 62201 denotes a CPU which controls the overall computer 6400 using programs and data stored in a RAM 62202 and ROM 62203, and controls data communications with an external device connected to an I/F 62207. Also, the CPU 62201 executes processes to be described later as those to be executed by the computer 6400.

Reference numeral 62202 denotes a RAM which can provide various areas such as an area for temporarily storing programs and data loaded from an external storage device 62205, an area for temporarily storing data received via the I/F 62207, a work area required when the CPU 62201 executes various kinds of processing, and the like, as needed.

Reference numeral 62203 denotes a ROM which stores a boot program, setting data of the computer 6400, and the like.

Reference numeral 62204 denotes an operation unit which comprises a keyboard, mouse, joystick, and the like, and can input various instructions to the CPU 62201 when it is operated by the operator of the computer 6400.

Reference numeral 62205 denotes an external storage device which serves as a large-capacity information storage device represented by a hard disk drive device. The external storage device 62205 saves an OS (operating system), programs that make the CPU 62201 execute the processes to be described later as those to be executed by the computer 6400, data, and the like. Some or all of these programs and data are loaded onto the RAM 62202 under the control of the CPU 62201. Also, known data (information) in the following description (or data required for the processing to be described later) are also saved in this external storage device 62205, and are loaded onto the RAM 62202 under the control of the CPU 62201 as needed.

Reference numeral 62206 denotes a display unit which comprises a CRT, liquid crystal display, or the like, and can display the processing results of the CPU 62201 by means of images, characters, and the like.

Reference numeral 62207 denotes an I/F, to which the position and orientation measuring device 6205, HMD 6100, and the like are connected. The computer 6400 can make data communications with the position and orientation measuring device 6205, HMD 6100, and the like via this I/F 62207.

Reference numeral 62208 denotes a bus which interconnects the aforementioned units.

The computer 6400 with the aforementioned arrangement captures physical space images from the cameras 6102*a* and 6102*b*, and generates images of virtual objects which are seen from the cameras 6102*a* and 6102*b* based on the position and orientation obtained from the magnetic receiver 6201. The computer 6400 superimposes the generated images onto the physical space images captured previously, and outputs the superimposed images to the display devices 6101*a* and 6101*b*. As a result, the MR space images corresponding to the positions and orientations of the eyes are displayed at positions in front of the right and left eyes of the observer who wears the HMD 6100 on the head.

Figure 10:
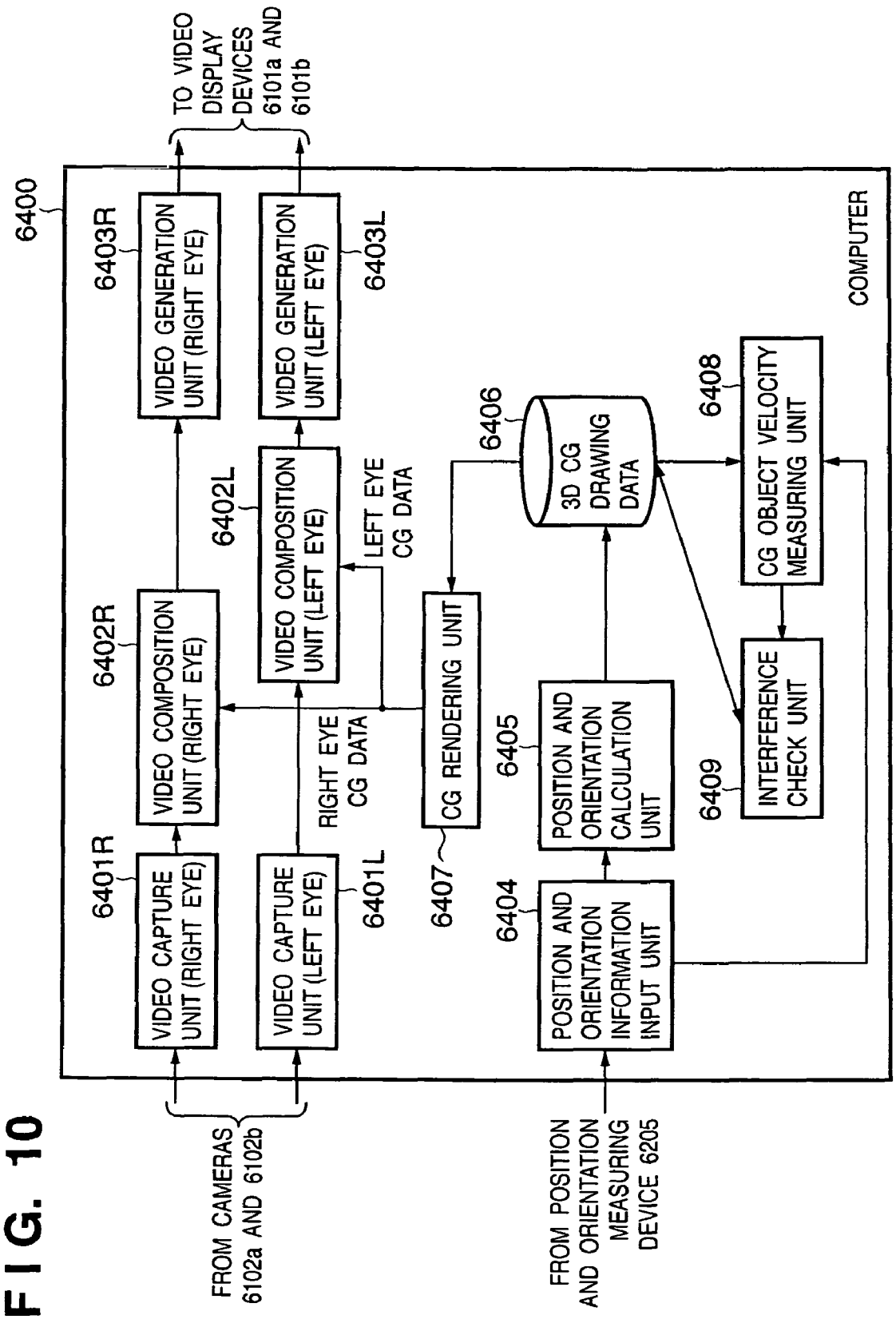
FIG. 10 is a block diagram showing the functional arrangement of a computer 6400.

FIG. 10 is a block diagram showing the functional arrangement of this computer 6400.

Reference numerals 6401R and 6401L denote video capture units, which respectively capture images input from the cameras 6102*a* and 6102*b* as data.

Reference numeral 6404 denotes a position and orientation information input unit, which fetches data output from the position and orientation measuring device 6205. This data includes the positions and orientations of the magnetic receiver 6201 and pointing tool 6300 on the sensor coordinate system.

Reference numeral 6406 denotes 3D CG drawing data, which is required to generate an image of a virtual object that forms the virtual space. In this embodiment, since the virtual object is made up of polygons, the 3D CG drawing data includes normal vector data of polygons, coordinate value data of vertices which form polygons, polygon color data, and texture image data and the like (required if texture mapping is done). Note that the present invention is not limited to polygons which form the virtual object.

Reference numeral 6405 denotes a position and orientation calculation unit, which calculates the positions and orientations of the cameras 6102*a* and 6102*b* on the sensor coordinate system using the data indicating the position and orientation of the magnetic receiver 6201 on the sensor coordinate system input from the position and orientation information input unit 6404 (if the position and orientation relationships between the magnetic receiver 6201 and the cameras 6102*a* and 6102*b* are calculated as bias data in advance, the positions and orientations of the cameras 6102*a* and 6102*b* can be calculated by adding the bias data to the position and orientation measured by the magnetic receiver 6201). Note that the cameras 6102*a* and 6102*b* will also be referred to as a "viewpoint" together hereinafter.

Reference numeral 6407 denotes a CG rendering unit which generates images of the virtual space, which are seen according to the positions and orientations of the cameras 6102*a* and 6102*b*. This virtual space includes a virtual object to be superimposed on the pointing tool 6300 (to be referred to as a "virtual object to be manipulated" hereinafter), and one or more virtual objects fixedly laid out on the virtual space (to be referred to as a "fixed layout virtual object" hereinafter).

Therefore, the CG rendering unit 6407 lays out a virtual object to be manipulated on the virtual space at the position and orientation of the pointing tool 6300 on the sensor coordinate system. The CG rendering unit 6407 also lays out a fixed layout virtual object on the virtual space at a predetermined position and orientation. The CG rendering unit 6407 then generates an image (virtual space image) viewed when the virtual space on which the virtual objects are laid out is observed in accordance with the positions and orientations of the cameras 6102*a* and 6102*b* calculated by the position and orientation calculation unit 6405.

Since the processing for generating an image of the virtual space viewed from the viewpoint having the predetermined position and orientation is a state-of-the-art technique, a detailed description thereof will be omitted.

Reference numerals 6402R and 6402L denote video composition units, which superimpose the "virtual object image which are to be seen according to the position and orientation of the camera 6102*a*" and "virtual object image which are to be seen according to the position and orientation of the camera 6102*b*", which are generated by the CG rendering unit 6407, onto the images of the physical space input from the video capture units 6401R and 6401L, and output these images to video generation units 6403R and 6403L, respectively. In this way, the image on the MR space, which is to be seen according to the position and orientation of the camera 6102a, and that on the MR space, which is to be seen according to the position and orientation of the camera 6102b, can be generated.

The video generation units 6403R and 6403L respectively convert the images on the MR space, which are output from the video composition units 6402R and 6402L into analog signals, and outputs the converted analog signals to the display devices 6101a and 6101b as video signals. In this way, the images on the MR space which correspond to the two eyes are displayed before the right and left eyes of the observer who wears the HMD 6100 on the head.

Reference numeral 6408 denotes a CG object velocity measuring unit which calculates the moving velocity of the pointing tool 6300 at the present timing with reference to "position information of the pointing tool 6300" sequentially obtained from the position and orientation information input unit 6404. Various methods of calculating the moving velocity are available. For example, a difference between position information obtained from the position and orientation calculation unit 6405 at time t and that obtained from the position and orientation calculation unit 6405 at time (t-1), i.e., a three-dimensional vector, is calculated, and the size of this vector may be used as the moving velocity of the pointing tool 6300 at time t.

Reference numeral 6409 denotes an interference check unit which executes processing for checking an interference state between the virtual object to be manipulated and fixed layout virtual object (whether or not they collide against each other). Such check processing is not always done, but it is determined depending on the moving velocity of the pointing tool 6300 calculated by the CG object velocity measuring unit 6408.

That is, when the moving velocity of the pointing tool 6300 is equal to or higher than a predetermined value, it is considered that the observer is in the process of moving the pointing tool 6300 to a desired position. If the interference state check processing is done at that timing, the observer is moving the pointing tool 6300 while worrying about the interference between the virtual object to be manipulated and the fixed layout virtual object, resulting in troublesome movement of the pointing tool 6300. In such case, the interference state check processing is skipped.

On the other hand, when the moving velocity of the pointing tool 6300 is equal to or lower than the predetermined value, it is considered that the observer moves the pointing tool 6300 to the vicinity of the desired position and is about to finely align the position and orientation of the virtual object to be manipulated. For example, when the virtual object to be manipulated is laid out at a predetermined position and orientation inside the fixed layout virtual object, after the virtual object to be manipulated is moved inside the fixed layout virtual object, the observer finely moves the pointing tool 6300 so that the virtual object to be manipulated has a desired position and orientation, thus aligning the position and orientation of the virtual object to be manipulated. If the interference state check processing is skipped at this timing, the observer cannot recognize if the virtual object to be manipulated neatly fits in the fixed layout virtual object. Hence, in such case, the interference state check processing is executed.

Therefore, the CG object velocity measuring unit 6408 notifies the interference check unit 6409 of the moving velocity of the pointing tool 6300 every time it calculates the moving velocity. If the notified speed is equal to or lower than the predetermined value, the interference check unit 6409 executes interference check processing; otherwise, it skips the interference check processing.

The interference state check processing between virtual objects is attained by checking, for example, whether or not polygons which form the respective virtual objects collide again each other. A technique for specifying the interfering parts when the interference state between virtual objects is checked and it is determined that the virtual objects interfere with each other is popularly used in the field of video games and the like, a detailed description thereof will be omitted.

When the interference check unit 6409 determines that the virtual object to be manipulated interferes with the fixed layout virtual object, it notifies the CG rendering unit 6407 of their interfering parts (polygons). The CG rendering unit 6407 changes the polygon colors of the interfering parts of the virtual object to be manipulated and the fixed layout virtual object or flickers them to visually clarify these interfering parts, so that the interfering parts are rendered to be different from the remaining parts.

Figure 11:
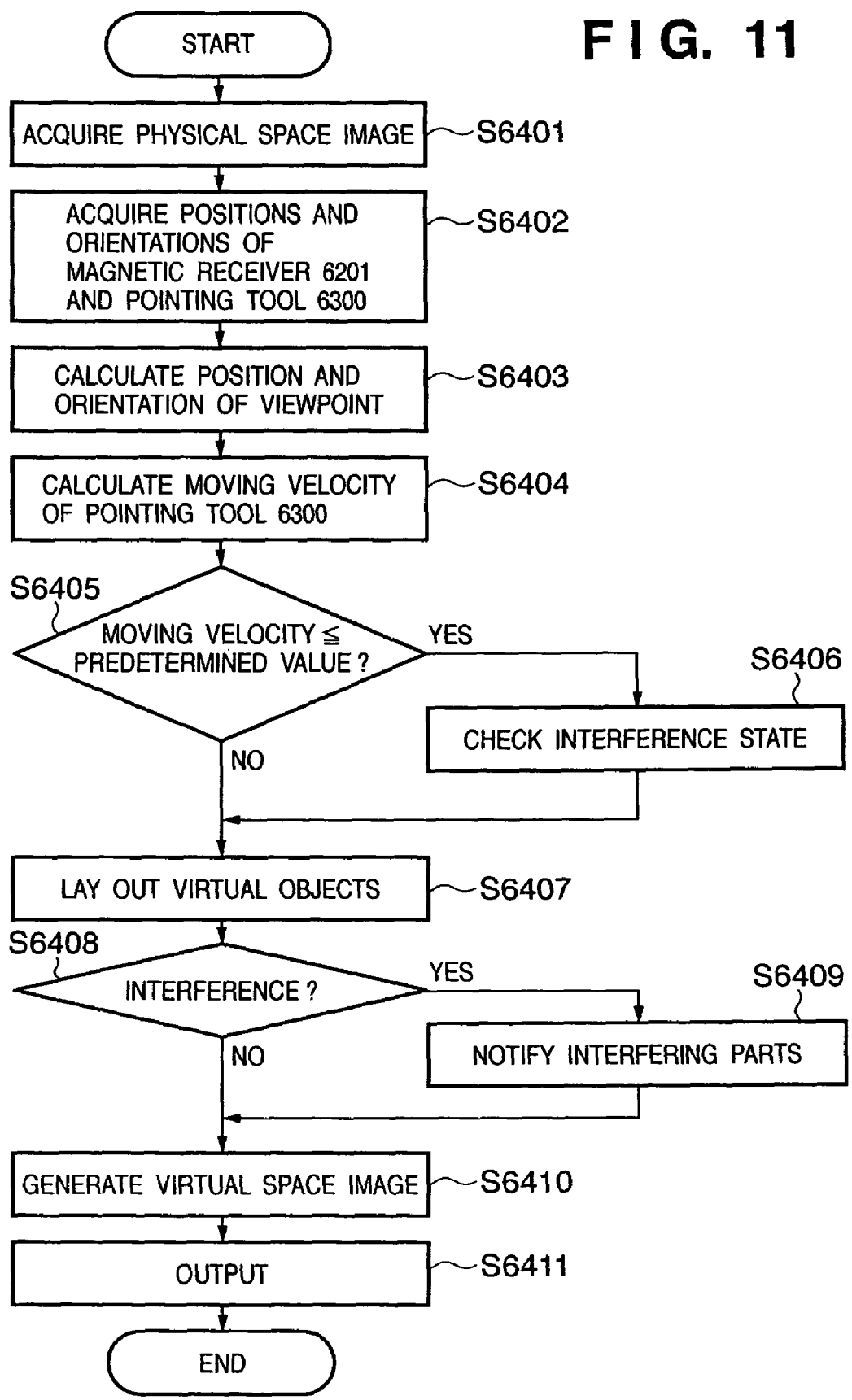
FIG. 11 is a flowchart of a series of processes from when MR space images for one frame are generated until they are output to display devices 6101a and 6101b.

FIG. 11 is a flowchart showing a series of processes from when an MR space image for one frame is generated until it is output to the display devices 6101a and 6101b. Note that the program and data for making the CPU 62201 execute the processing according to the flowchart in FIG. 11 are saved in the external storage device 62205, and are loaded onto the RAM 62202 under the control of the CPU 62201. When the CPU 62201 executes processing using the loaded program and data, the computer 6400 executes processes to be described below.

Since the images of the physical space captured by the cameras 6102a and 6102b are input into the computer 6400 via the I/F 62207, the CPU 62201 stores them in the RAM 62202 (step S6401).

Since data indicating the position and orientation of the magnetic receiver 6201 on the sensor coordinate system are input from the position and orientation measuring device 6205 into the computer 6400 via the I/F 62207, the CPU 62201 stores them in the RAM 62202 (step S6402).

Note that the processes in steps S6401 and S6402 are independently executed. Hence, the execution order of the processes in these steps is not limited to that in FIG. 11.

The CPU 62201 adds the bias data to the position and orientation of the magnetic receiver 6201 on the sensor coordinate system to calculate the positions and orientations of the cameras 6102a and 6102b on the sensor coordinate system. Then, data indicating the position and orientation of the viewpoint on the sensor coordinate system are temporarily stored in the RAM 62202 (step S6403).

The CPU 62201 calculates the moving velocity of the pointing tool 6300 at the present timing using the position information of the pointing tool 6300 acquired in step S6402 and that of the pointing tool 6300 acquired previously (step S6404). The calculation method is not particularly limited, as described above.

The CPU 62201 checks if the calculated moving velocity is equal to or lower than the predetermined value (step S6405). If the moving velocity is equal to or lower than the predetermined value, the flow advances to step S6406 to check the interference state between the virtual object to be manipulated and the fixed layout virtual object (step S6406).

After the processing in step S6406, or if the moving velocity is equal to or higher than the predetermined value, the flow advances to step S6407 to lay out the virtual object to be manipulated and the fixed layout virtual object on the virtual space (step S6407). That is, the virtual object to be manipulated is laid out on the virtual space at the position and orientation of the pointing tool 6300 on the sensor coordinate system acquired in step S6402, and the fixed layout virtual object is laid out on the virtual space at the predetermined position and orientation. Note that the layout position and orientation of the fixed layout virtual object are not limited to fixed ones, and they may change dynamically.

The CPU 62201 checks if it is determined in step S6406 that the virtual objects interfere with each other (step S6408). If it is determined that the virtual objects interfere with each other, the flow advances to step S6409 to execute processing for notifying the interfering parts (step S6409). As the notification method of this embodiment, the interfering parts may be rendered in red or they may be flickered, thus visually notifying the interfering parts.

The CPU 62201 generates, on the RAM 62202, an image (virtual space image) viewed when such virtual space on which the virtual objects are laid out is seen from the viewpoint having the position and orientation calculated in step S6403 (step S6410). That is, the CPU 62201 generates images of the virtual space which are seen from the cameras 6102*a* and 6102*b*.

Since the physical space images which are seen from the cameras 6102*a* and 6102*b* have already been stored in the RAM 62202 in step S6401, the virtual space images which are seen from the cameras 6102*a* and 6102*b* are generated on these images, the images of the MR space which are seen from the cameras 6102*a* and 6102*b* are consequently generated on the RAM 62202.

Hence, the CPU 62201 outputs these MR space images to the display devices 6101*a* and 6101*b* via the I/F 62207 (step S6411).

As described above, according to this embodiment, when the observer moves the virtual object to be manipulated to a desired position and orientation, the check processing is skipped during movement, i.e., when he or she does not want to check the interference state with the fixed layout virtual object. On the other hand, the check processing is executed when the observer adjusts the position and orientation of the virtual object to be manipulated, i.e., when he or she wants to check the interference state with the fixed layout virtual object. As a result, the observer can easily perform manipulations for moving the virtual object to be manipulated to the desired position and orientation inside the fixed layout virtual object.

In this embodiment, when the virtual objects interfere with each other, such state is notified by using a different display pattern of the interfering parts of the respective virtual objects from the remaining parts. However, various other notification methods may be used. For example, when the virtual objects interfere with each other, such state may be notified audibly or it may be displayed as text on the display devices 6101*a* and 6101*b*. When the interference state is audibly notified, the computer 6400 must comprise audio data, a converter for converting this audio data into an analog signal, and a loudspeaker for outputting a voice based on the analog signal.

As another notification method, using a kinesthetic sense presentation device, kinesthetic sense presentation may be made to move the pointing tool 6300 in a non-interfering direction.

Fifth Embodiment

In the fourth embodiment, only the "moving velocity of the pointing tool 6300" is used as a criterion for determining whether or not to execute the check processing of the interference state between the virtual objects. In this embodiment, the "moving direction of the pointing tool 6300" and the "positional relationship between the virtual object to be manipulated and fixed layout virtual object" are used as criteria.

Note that the arrangement of the system according to this embodiment is the same as that in the fourth embodiment, but the functional arrangement of the computer 6400 is different from that in the fourth embodiment.

Figure 12:
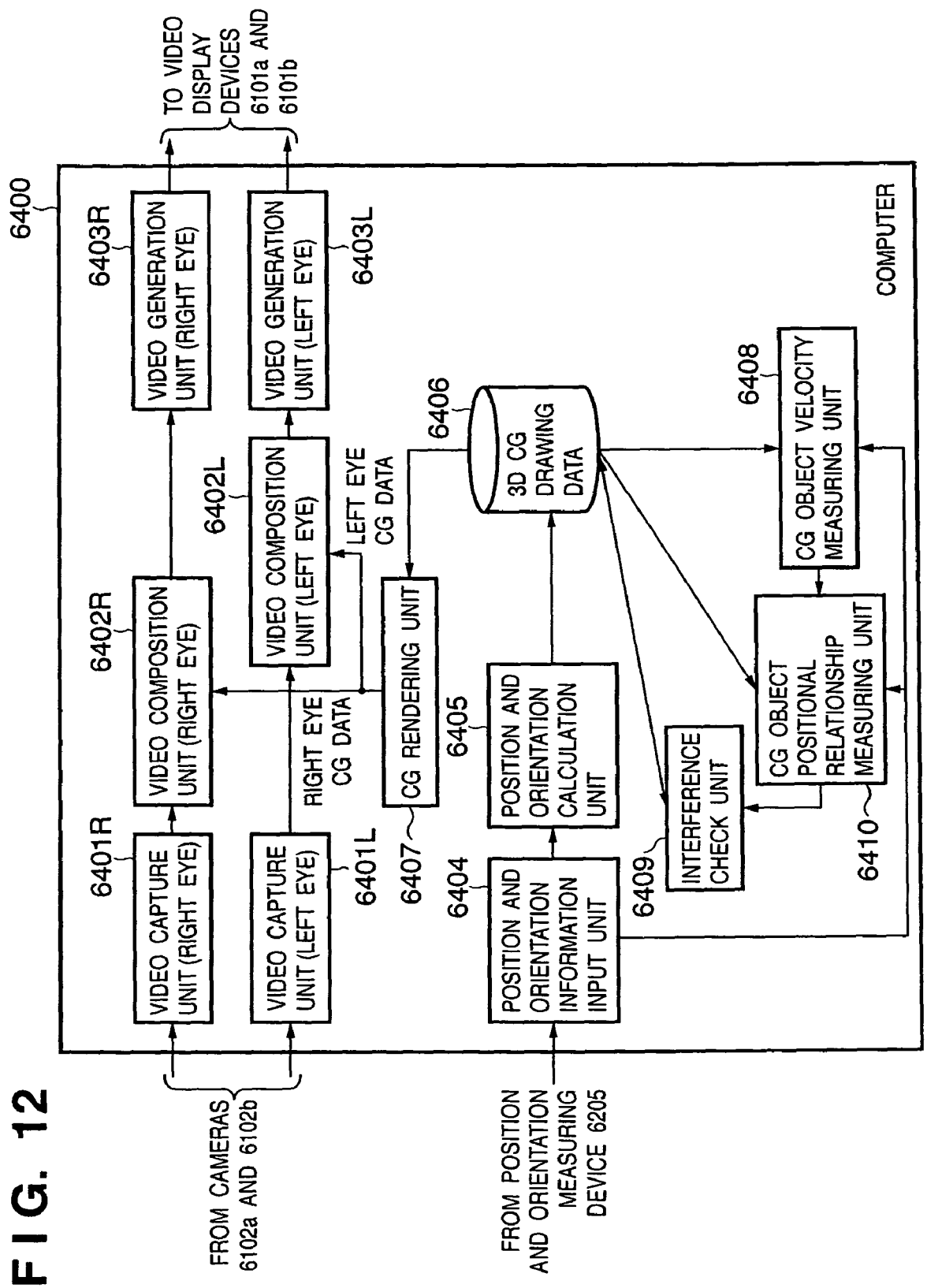
FIG. 12 is a block diagram showing the functional arrangement of a computer 6400 according to the fifth embodiment of the present invention.

FIG. 12 is a block diagram showing the functional arrangement of the computer 6400 according to this embodiment. Note that the same reference numerals in FIG. 12 denote the same parts as in FIG. 10, and a description thereof will be omitted. In the arrangement shown in FIG. 12, a CG object positional relationship measuring unit 6410 is added to the arrangement shown in FIG. 10. Note that the fifth embodiment is substantially the same as the fourth embodiment, except for the following points.

The CG object velocity measuring unit 6408 calculates the moving velocity of the pointing tool 6300 as in the fourth embodiment. However, this embodiment pays notice to the moving direction of the pointing tool 6300.

The CG object positional relationship measuring unit 6410 calculates the positional relationship between the virtual object to be manipulated and the fixed layout virtual object.

Figure 13:
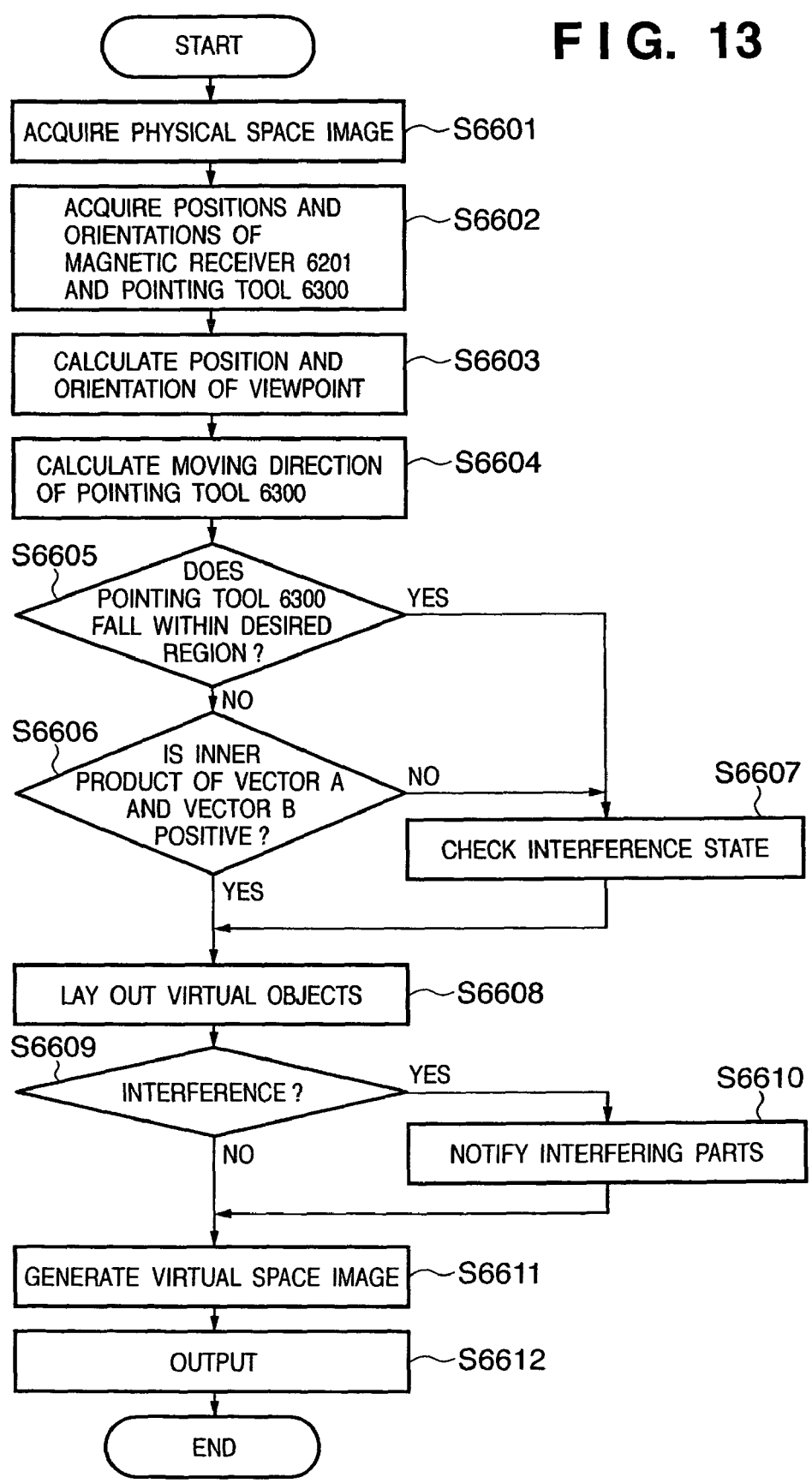
FIG. 13 is a flowchart of a series of processes from when MR space images for one frame are generated until they are output to the display devices 6101*a* and 6101*b;*

FIG. 13 is a flowchart showing a series of processes from when an MR space image for one frame is generated until it is output to the display devices 6101*a* and 6101*b*. Note that the program and data for making the CPU 62201 execute the processing according to the flowchart in FIG. 13 are saved in the external storage device 62205, and are loaded onto the RAM 62202 under the control of the CPU 62201. When the CPU 62201 executes processing using the loaded program and data, the computer 6400 executes processes to be described below.

Note that the processes in steps S6601 to S6604 are the same as those in steps S6401 to S6404, and the moving velocity calculated in step S6604 is obtained as a velocity vector. For example, a difference between position information obtained from the position and orientation calculation unit 6405 at time t and that obtained from the position and orientation calculation unit 6405 at time (t-1), i.e., a three-dimensional vector, is calculated as a velocity vector.

Next, the CPU 62201 serves as the CG object positional relationship measuring unit 6410 to determine the positional relationship between the virtual object to be manipulated and the fixed layout virtual object (step S6605). In this embodiment, it is determined whether or not the virtual object to be manipulated is located inside the fixed layout virtual object. Since processing for determining whether or not one virtual object is located inside the other virtual object is known to those who are skilled in the art, a description thereof will be omitted.

If the virtual object to be manipulated is located inside the fixed layout virtual object, the flow advances to step S6607, and the check processing of the interference state between the virtual object to be manipulated and fixed layout virtual object is executed as in step S6406 (step S6607). That is, when the virtual object to be manipulated is laid out at a predetermined position and orientation inside the fixed layout virtual object, after the virtual object to be manipulated is moved inside the fixed layout virtual object, the observer finely moves the pointing tool 6300 so that the virtual object to be manipulated has a desired position and orientation, thus aligning the position and orientation of the virtual object to be manipulated. If the interference state check processing is skipped at this timing, the observer cannot recognize if the virtual object to be manipulated neatly fits in the fixed layout virtual object. Hence, in such case, the interference state check processing is executed. Upon completion of the processing in step S6607, the flow advances to step S6608.

On the other hand, if the virtual object to be manipulated is located outside the fixed layout virtual object, the flow advances to step S6606. In step S6606, in order to determine whether or not the virtual object to be manipulated is moving toward the interior of the fixed layout virtual object, an inner product value of the three-dimensional vector (vector A indicating the moving direction of the pointing tool 6300) calculated in step S6604, and vector B from the position of the virtual object to be manipulated (that of the pointing tool 6300) toward the layout position of the fixed layout virtual object is calculated, and it is checked if the calculated inner product value is positive (step S6606).

If the virtual object to be manipulated is not moving toward the interior of the fixed layout virtual object, since the inner product value assumes a negative value, the flow advances to step S6607 in such case to execute the interference state check processing.

On the other hand, if the virtual object to be manipulated is moving toward the interior of the fixed layout virtual object, since the inner product value assumes a positive value, the interference state check processing in step S6607 is skipped in such case, and the flow advances to step S6608. That is, upon laying out the virtual object to be manipulated at a predetermined position and orientation in the fixed layout virtual object, when the pointing tool 6300 is located outside the fixed layout virtual object and is moving toward the fixed layout virtual object, it is considered that the observer is in the process of moving the pointing tool 6300 to a desired position. If the interference state check processing is done at that timing, the observer is moving the pointing tool 6300 while worrying about the interference between the virtual object to be manipulated and the fixed layout virtual object, resulting in troublesome movement of the pointing tool 6300. In such case, the interference state check processing is skipped.

Then, the processes in step S6608 and subsequent steps are executed in the same manner as in step S6407 and subsequent steps.

In this embodiment, as an example of processing for determining the positional relationship between the virtual object to be manipulated and the fixed layout virtual object, whether or not the virtual object to be manipulated is located inside the fixed layout virtual object is determined. However, an embodiment that determines more commonly "whether or not the positional relationship between the virtual object to be manipulated and the fixed layout virtual object satisfies a predetermined positional relationship" may be adopted.

Sixth Embodiment

In the fourth embodiment, only the "moving velocity of the pointing tool 6300" is used as a criterion for determining whether or not to execute the check processing of the interference state between the virtual objects. In this embodiment, an "estimation load to be given to the computer 6400 to execute the interference state check processing" is used as this criterion.

Note that the arrangement of the system according to this embodiment is the same as that in the fourth embodiment, but the functional arrangement of the computer 6400 is different from that in the fourth embodiment.

Figure 14:
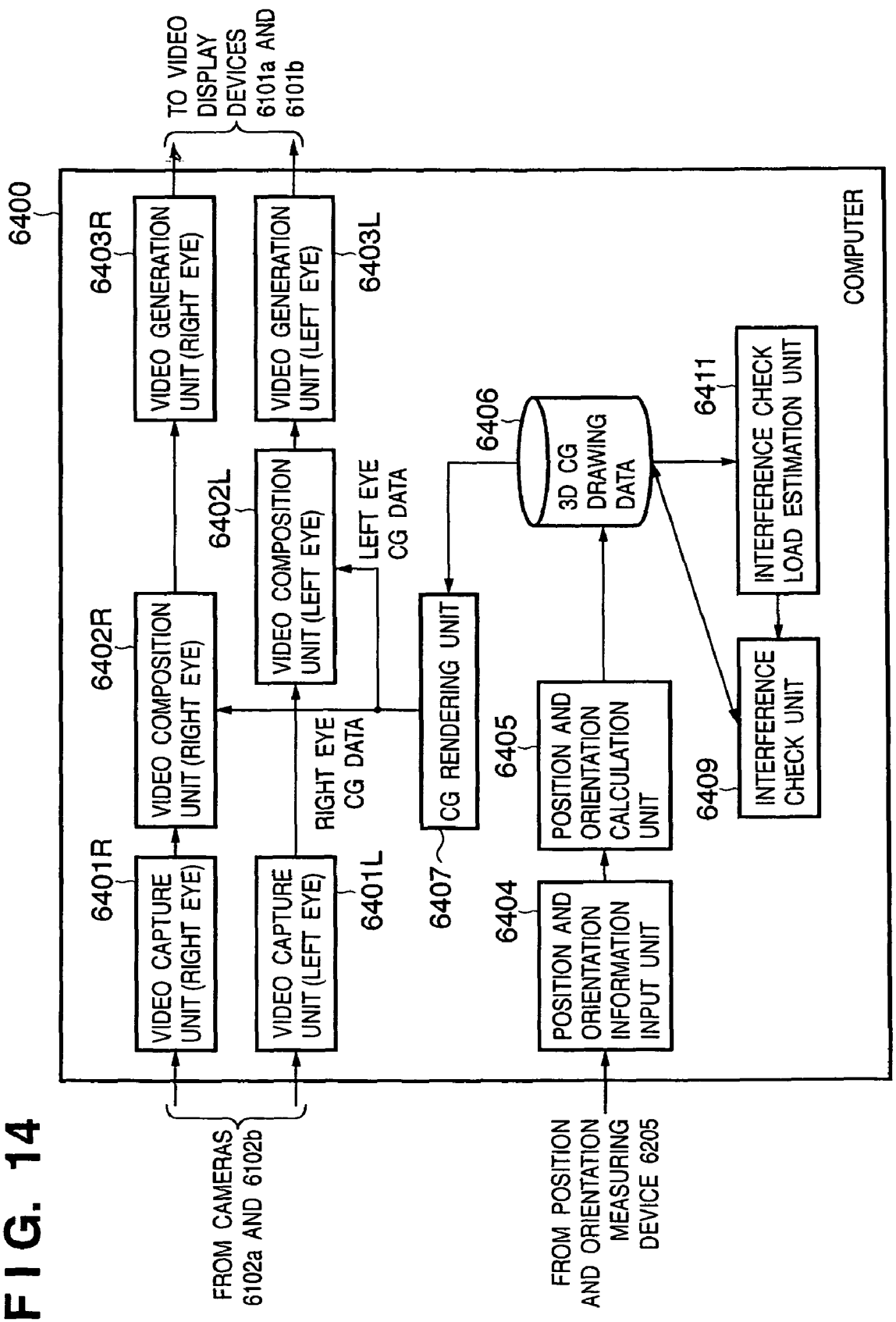
FIG. 14 is a block diagram showing the functional arrangement of a computer 6400 according to the sixth embodiment of the present invention.

FIG. 14 is a block diagram showing the functional arrangement of the computer 6400 according to this embodiment. Note that the same reference numerals in FIG. 14 denote the same parts as in FIG. 10, and a description thereof will be omitted. In the arrangement shown in FIG. 14, the CG object velocity measuring unit 6408 in the arrangement shown in FIG. 10 is replaced by an interference check load estimation unit 6411. Note that the sixth embodiment is substantially the same as the fourth embodiment, except for the following points.

The interference check load estimation unit 6411 executes processing for estimating a processing load when the CPU 62201 executes the check processing of the interference state between the virtual object to be manipulated and the fixed layout virtual object. If this processing load is heavy, it influences, e.g., MR space image generation processing, and the image rendering rate and frame rate drop.

Hence, the interference check load estimation unit 6411 estimates this processing load. When the estimated processing load is equal to or larger than a predetermined value, i.e., when the processing load is equal to or larger than that which influences other processes (including MR space image generation processing), the interference check load estimation unit 6411 sends a message that advices accordingly to the interference check unit 6409. When the estimated processing load is equal to or larger than the predetermined value, the interference check unit 6409 skips the interference state check processing; otherwise, it executes the interference state check processing since that processing does not influence other processes.

Note that the flowchart of a series of processes from when an MR space image for one frame is generated until it is output to the display devices 6101a and 6101b according to this embodiment is substantially the same as that in FIG. 11, except for the following changes.

That is, in step S6404 the CPU 62201 estimates the processing load of the interference state check processing between the virtual object to be manipulated and the fixed layout virtual object. In step S6405, the CPU 62201 determines if the estimated processing load is equal to or larger than the predetermined value. If the estimated processing load is equal to or larger than the predetermined value, the flow advances to step S6407; otherwise, the flow advances to step S6406.

Seventh Embodiment

In the above embodiments, the interference state check processing is skipped depending on a predetermined state. However, in place of completely skipping the interference state check processing, a simple check method may be used if it is available.

In the above embodiments, the video see-through HMD 6100 is used. Alternatively, an optical see-through HMD may be used.

Also, "indices used to determine whether or not the interference state check processing is to be executed" used in the above embodiments may be combined as needed.

In the above embodiments, the position and orientation of the viewpoint of the observer are acquired using the magnetic sensor. Alternatively, other types of sensors, e.g., an optical sensor, ultrasonic wave sensor, and the like may be used.

Means for acquiring the position and orientation of the viewpoint is not limited to the use of the sensor. For example, a general method may be used. That is, a marker is laid out on the physical space, and the position and orientation of the HMD 6100 are acquired using the layout position of the marker and a marker coordinate position on an image obtained by capturing the marker by the camera. Hence, the present invention is not limited to use of the sensor as long as the position and orientation of the viewpoint can be acquired.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores a program code corresponding to the aforementioned flowchart.

As many apparently widely different embodiments of the present invention can be made without departing from the spirit and scope thereof, it is to be understood that the invention is not limited to the specific embodiments thereof except as defined in the appended claims.

This application claims the benefit of Japanese Application Nos. 2005-138453 filed May 11, 2005, 2005-159855 filed May 31, 2005, and 2005-187081 filed Jun. 27, 2005, which are hereby incorporated by reference herein in their entirety.

What is claimed is:

1. A virtual reality presentation apparatus which displays an image generated based on three-dimensionally modeled CG objects, and displays an image according to a change in line of sight position of an observer, comprising:
   an image display unit adapted to display the image;
   a moving unit adapted to move a manipulation target CG object to a position and orientation measured by a position and orientation sensor manipulated by the observer;
   a check unit adapted to check for an interference between the manipulation target CG object and another CG object;
   a storage unit adapted to store time at which said check unit detects the interference into a memory of the apparatus and set TRUE in SKIP variable, if said check unit detects the interference and the SKIP variable is FALSE;
   a determination unit adapted to determine whether or not difference between current time and the stored time exceeds a detection suppression time period, when the SKIP variable is TRUE;
   a setting unit adapted to set FALSE in the SKIP variable when the difference exceeds the detection suppression time period;
   a processing time measuring unit adapted to measure a processing time period required for detection of the immediately preceding interference by said check unit;
   a detection suppression time period setting unit adapted to set detection suppression time period so as to be longer when the measured processing time period is longer, and to set the detection suppression time period so as to be shorter when the measured processing time period is shorter, and
   a control unit adapted to cause said check unit to suppress the interference detection within the set detection suppression time period after detection of the interference by said check unit.

2. A virtual reality presentation method which displays an image generated based on three-dimensionally modeled CG objects, and displays an image according to a change in line of sight position of an observer, comprising:
   an image display step of displaying the image with an image display unit;
   a moving step of moving a manipulation target CG object to a position and orientation measured by a position and orientation sensor manipulated by the observer;
   a check step of checking for an interference between the manipulation target CG object and another CG object;
   a storing step of storing time, at which the interference is detected, into a memory of the apparatus;
   a setting TRUE step of setting TRUE in SKIP variable, if the interference is detected and the SKIP variable is FALSE;
   a determining step of determining whether or not difference between current time and the stored time exceeds a detection suppression time period, when the SKIP variable is TRUE;
   a setting FALSE step of setting FALSE in the SKIP variable when the difference exceeds the detection suppression time period;
   a processing time measuring step of measuring a processing time period required for detection of the immediately preceding interference by said check step;
   a detection suppression time period setting step of setting detection suppression time period so as to be longer when the measured processing time period is longer, and to set the detection suppression time period so as to be shorter when the measured processing time period is shorter, and
   a control step of causing the check step to suppress the interference detection within the set detection suppression time period after detection of the interference by said check step.

* * * * *